(12) United States Patent
Romesburg

(10) Patent No.: US 6,570,985 B1
(45) Date of Patent: May 27, 2003

(54) ECHO CANCELER ADAPTIVE FILTER OPTIMIZATION

(75) Inventor: Eric Douglas Romesburg, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/156,728

(22) Filed: Sep. 17, 1998

Related U.S. Application Data

(63) Continuation-in-part of application No. 09/005,149, filed on Jan. 9, 1998.

(51) Int. Cl.$^7$ ............................................... H04M 9/08
(52) U.S. Cl. ............................ 379/406.08; 379/406.01; 379/406.02; 379/406.06; 379/406.09; 379/406.14; 379/390.03; 379/390.02; 379/390.04
(58) Field of Search ..................... 379/406.01–406.16

(56) References Cited

U.S. PATENT DOCUMENTS

| | | | |
|---|---|---|---|
| 4,591,669 A | | 5/1986 | Duttweiler et al. ...... 179/170.2 |
| 5,146,470 A | * | 9/1992 | Fujii et al. |
| 5,546,459 A | * | 8/1996 | Sih et al. |
| 5,570,423 A | | 10/1996 | Walker et al. .............. 379/410 |
| 5,668,794 A | * | 9/1997 | McCaslin et al. |
| 5,687,229 A | * | 11/1997 | Sih et al. |
| 5,734,715 A | | 3/1998 | Scalart et al. ............... 379/410 |
| 5,920,834 A | * | 7/1999 | Sih et al. |
| 5,995,620 A | * | 11/1999 | Wigren |

OTHER PUBLICATIONS

Evans et al; Analysis and Implementation of Variable Step Size Adaptive Algorithms, IEEE Trans. on Signal Processing, vol. 41, No. 8, 1993; pp. 2517–2535.*

Haykin, S., Adaptive Filter Theory (3rd Edition); 1996, Prentice Hall; pp. 432–439; Chap. 13, lines 562–588.*
Vaseghi, S.V., "Advanced Signal Processing and Digital Noise Reduction"; 1996, Pub. Wiley & Teubner, New York; Chapter 1 pp. 328–432.*
International Search Report for PCT/US99/21543 completed on Nov. 16, 1999, mailed Nov. 22, 1999.
U.S. patent application Ser. No. 08/852,729, filed May 7, 1997.
U.S. patent application Ser. No. 09/005,149, filed Jan. 9, 1998.
*On the Convergence Behavior of the LMS and the Normalized LMS Algorithms* by Dirk T.M. Slock, IEEE Transactions on Signal Processing, vol. 41, No. 9, Sep. 1993, pp. 2811–2825.

* cited by examiner

Primary Examiner—Forester W. Isen
Assistant Examiner—Ramnandan Singh
(74) Attorney, Agent, or Firm—Coats & Bennett, P.L.L.C.

(57) ABSTRACT

The Least Mean Square (LMS) and Normalized LMS (NLMS) algorithms commonly employed in adaptive filters of echo cancelers are further optimized. Finite impulse response (FIR) filters are used to estimate a transfer function of an echo channel in a communications link. The LMS and NLMS algorithms are used to adapt the filter coefficients of the estimated transfer functions. By including the echo channel energy gain in the LMS or NLMS update equation, adaptation speed is increased by making adaptation responsive to the channel energy gain. An algorithm for estimating the echo channel energy gain adapts the estimate based on measured system parameters, such as a measured instantaneous channel gain and a near-end voice level. By considering in the NLMS algorithm, the average energy of either the microphone signal or the error signal, as well as the standard reference signal, a higher nominal update gain can be used. With a higher nominal update gain, the NLMS algorithm will converge more quickly.

23 Claims, 8 Drawing Sheets

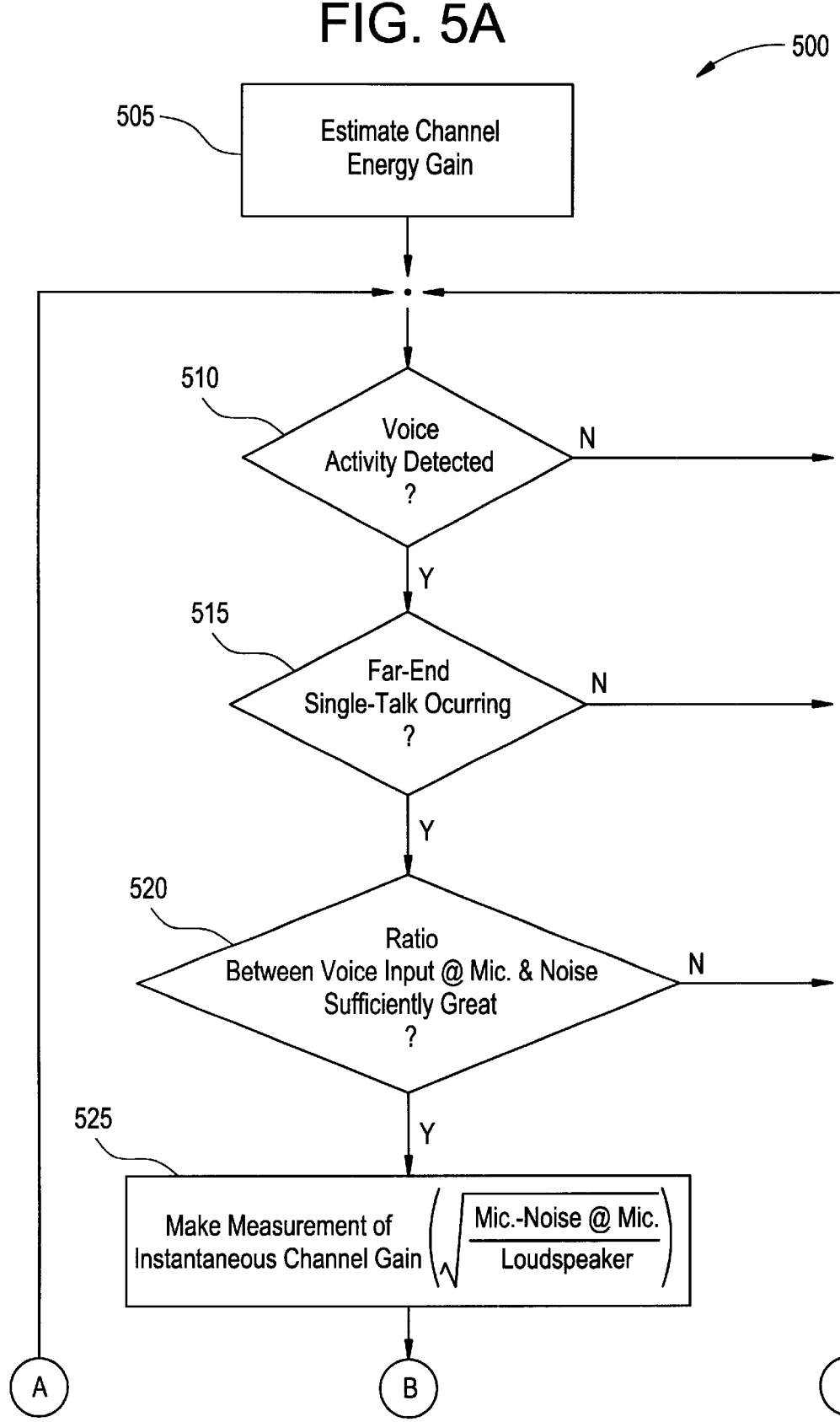

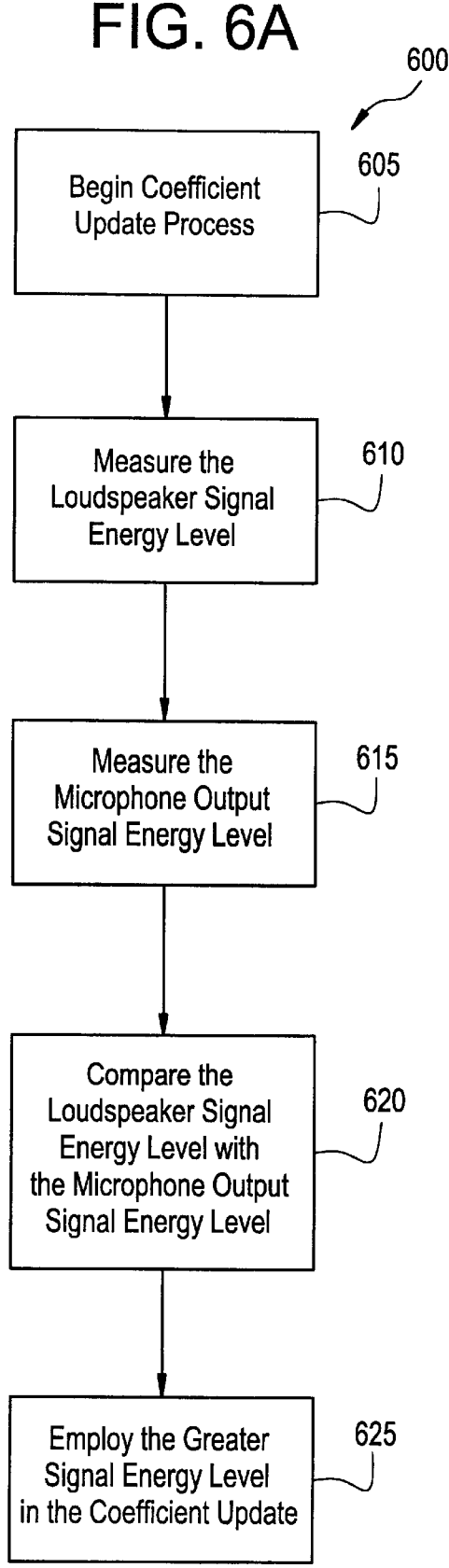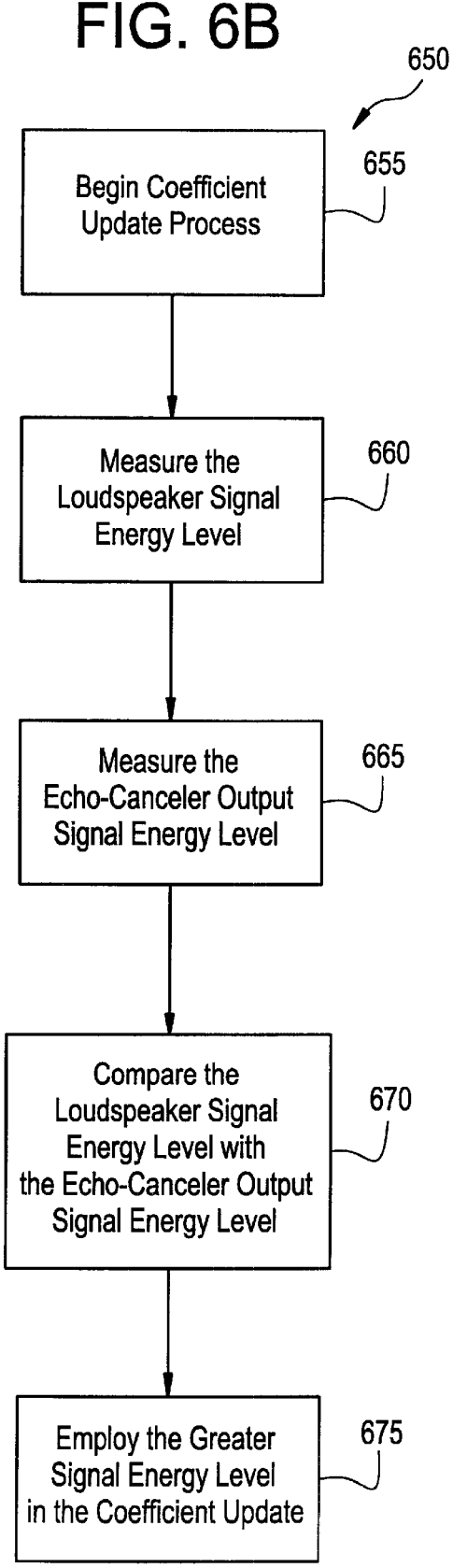

ECHO CANCELER ADAPTIVE FILTER OPTIMIZATION

CROSS-REFERENCE TO RELATED APPLICATIONS

This application is a continuation-in-part of Application No. 09/005,149, filed Jan. 9, 1998, and entitled "Method and Apparatus for Improved Echo Suppression in Communications Systems". application Ser. No. 09/005,149, which is hereby incorporated by reference in its entirety herein, was filed in the name of the same inventor and is under common assignment (Assignee's Reference No. EUS 314/1058-RMOT).

BACKGROUND OF THE INVENTION

1. Technical Field of the Invention

The present invention relates in general to the communications field and, in particular, to echo cancelation in communications systems.

2. Description of Related Art and Objects of the Invention

Telecommunications provides the ability for one person or group to communicate with another person or group over great distance. In many telecommunications systems, for example landline and wireless telephone systems, voice signals are often transmitted between two system users via a bi-directional communications link. In such systems, speech of a near-end user is typically detected by a near-end microphone at one end of the communications link and then transmitted over the link to a far-end loudspeaker for reproduction and presentation to a far-end user. Conversely, speech of the far-end user is detected by a far-end microphone and then transmitted via the communications link to a near-end loudspeaker for reproduction and presentation to the near-end user.

At either end of the communications link, loudspeaker output detected by a proximate microphone may be inadvertently transmitted back over the communications link, resulting in what may be unacceptably disruptive feedback, or echo, from a user perspective. Furthermore, if the round-trip loop gain is greater than unity at any audible frequency, then the system will tend to "howl," i.e., tend to produce a high-pitched whine from feedback effects, as is well known in the art.

Therefore, in order to avoid transmission of such undesirable echo signals, the microphone acoustic input should be isolated from loudspeaker output as much as possible. With a conventional telephone handset, in which the handset microphone is situated close to the user's mouth while the handset loudspeaker essentially covers the user's ear, the requisite isolation is easily achieved. However, as the physical size of portable telephones has decreased, and as handsfree speaker-phones have become more popular, manufacturers have moved toward designs in which the acoustic path from the loudspeaker to the microphone is not blocked by the user's head or body. As a result, the need for more sophisticated echo suppression techniques has become paramount in modern systems.

The need is particularly pronounced in the case of handsfree automobile telephones, where the closed vehicular environment can cause multiple reflections of a loudspeaker signal to be coupled back to a high-gain handsfree microphone. Movement of the user in the vehicle and changes in the relative directions and strengths of the echo signals, for example as windows are opened and closed or as the user moves his head while driving, further complicate the task of echo suppression in the automobile environment. Additionally, more recently developed digital telephones process speech signals through vocoders which introduce significant signal delays and create non-linear signal distortions. As is well known, these prolonged delays tend to magnify the problem of signal echo from a user perspective, and the additional nonlinear distortions can make echo suppression difficult once a speech signal has passed through a vocoder.

Considering, as a specific example, a vehicle-mounted handsfree accessory, the near-end microphone is typically about 12 inches from the near-end user's mouth. For the microphone to be sensitive enough to pick up the user's speech, it also is sensitive enough to easily pick up the sound coming from the loudspeaker and any noise inside the car. Without acoustic-echo suppression, the far-end user hears his or her own voice coming back to the near-end microphone as it bounces around inside the car after being broadcast from the loudspeaker. This unsuppressed acoustic echo is so annoying to the far-end user as to make it impossible for him or her to converse.

Thus, an ideal acoustic-echo suppressor prevents the far-end user from hearing the echo of his or her own voice while at the same time permitting natural, full-duplex conversation. However, because the automobile environment is especially challenging for an acoustic-echo suppressor to meet this goal, prior art methods have proven less than ideal.

The automobile environment is particularly difficult for a number of additional reasons. First, double-talk situations occur frequently because people often give verbal feedback while listening. Second, the typical signal processing delays associated with digital systems require that the echo suppression be very high (e.g., 45 dB for single talk and 25 dB for double talk). Third, the reverberation inside an automobile typically takes about 50 ms to decay by 45 dB, and installations vary in the position of the microphone relative to the loudspeaker.

Further reasons that acoustic echo suppression in the context of handsfree automobile telephony is especially difficult include: the signal-to-noise ratio for the mobile user's speech can be as low as 0 dB; the echo from the loudspeaker to the microphone can be louder than the mobile user's voice into the microphone; the far-end signal can be very noisy in the context of a handsfree-to-handsfree call or where the radio frequency reception between users is of poor quality; the echo path between the loudspeaker and the microphone changes constantly as the mobile user moves around, and such change is significant because the mobile user's head is typically the main obstacle or the main reflection surface between the loudspeaker and the microphone; the echo path is non-linear due to loudspeaker distortion; and the voice signal used to train the echo suppressor has periodic components within vowel sounds which create a temporary echo-path-phase ambiguity.

In addition to acoustic-type echo suppression, network-type echo suppression is also desirable in the context of mobile telephony so that, for example, a mobile user does not hear his or her own voice echoed back through a loudspeaker in the case of analog (e.g., AMPS) calls. In other words, unlike digital systems (e.g., D-AMPS and GSM), many analog systems do not cancel echoes caused by the impedance mismatch of the 4-to-2-wire hybrid typically located at the central office of a public switched telephone network (PSTN). Additionally, handsfree accessory system code can introduce an extra 4–10 msec of delay, and a digital phone can introduce an extra 4 msec of round-trip delay.

Therefore, network echo is particularly perceptible with a vehicle handsfree accessory.

Network-type echo cancelation in the context of mobile telephony presents other problems as well. For example, because the network echo is different for every call, adaptive filter coefficients should not be reused, and adaptation should be extremely fast. Additionally, a network-echo suppressor should re-adapt quickly after a cellular hand-off to an analog cell, and it should be disabled after a hand-off to a digital cell. Advantageously, the teachings of the present invention may be utilized to optimize such a network-echo canceler.

In summary, echo cancelers can be used in telephony systems to reduce or eliminate annoying echo effects. For example, in cellular Public Land Mobile Networks (PLMNs), echo cancelers are used in mobile services switching centers (MSCs) to suppress or remove echoes in speech traffic. Echo cancelers are also used in mobile radiotelephones and handsfree telephone equipment to compensate for acoustical echoes. Finally, echo cancelers are employed within the PSTN to reduce or eliminate echos arising from impedance mismatches.

Referring now to FIG. 1, a simplified schematic block diagram of a conventional echo canceler 100 is illustrated. An echo path is denoted by 110 and represents speech signal(s) being reflected back to the far-end user (not pictured) The main component of such a conventional echo canceler 100 is an adaptive finite-impulse-response (FIR) filter 120. Under the control of an adaptation algorithm (e.g., in software), the filter 120 models the impulse response of the echo path.

A non-linear processor (NLP) 130 is used to remove residual echo that may remain after linear processing of the input signal. The block "H" denoted by 140 represents the echo source in the telephony system which passes the "desired" signal from a near-end user (not-pictured) . A signal combiner 150 is used to subtract out the unwanted echo component, as estimated by the filter 120, from the "desired" signal. A feedback signal 160 provides control feedback from the output of the signal combiner 150 to an input of the filter 120. The resulting signal after the signal combiner 150 (and especially after the NLP 130) has, hopefully, no echo component.

Unfortunately, the ability of echo cancelers to cancel the echo component from the "desired" signal is heavily dependent on the quality of the algorithm used in the filter 120. One algorithm used in existing systems is the Least Mean Square (LMS) algorithm; another is the Normalized LMS (NLMS) algorithm. These algorithms are used to adapt the filtering process that occurs within the filter 120, but prior art implementations of these algorithms have been deficient in several areas.

For example, both the LMS and the NLMS algorithm require that an update gain (the filtering in the filter 120 is being updated) be selected and fixed for a given installation. Selecting this update gain demands various tradeoffs in performance. If the fixed update gain is set so that the algorithm is stable when the gain of the echo channel is very low, then that setting of the fixed update gain causes slow adaptation when the gain of the echo channel is high. On the other hand, if the fixed update gain is set so that the filter adapts quickly when the gain of the echo channel is high, then that setting causes instability in the system when the gain of the echo channel is very low.

As an additional example, the conventional NLMS algorithm produces high update gain for small reference signals even though the resulting echo may be overwhelmed by noise at the microphone. Consequently, the algorithm either is unstable or must be slowed down at all times (by reducing the fixed update gain) to handle this possibility. In either situation, the prior art algorithm is sub-optimal.

In summary, while existing systems have heretofore used the LMS and NLMS algorithms in the modeling of echo signals, such existing systems have done so only non-optimally. The present invention optimizes the algorithms by achieving the following (and other) objects of the invention:

An object of the invention is to provide an adaptation algorithm that has an overall update gain that is proportional to the gain of the echo channel.

Another object of the invention is to provide an adaptation algorithm that can incorporate a higher nominal update gain by specifically accounting for situations with, for example, small reference signals at a loudspeaker and high noise at a corresponding microphone.

SUMMARY OF THE INVENTION

The present invention fulfills the above-described and other needs by providing optimizations for use in echo cancelers. Echo canceling devices constructed in accordance with the teachings of the present invention include an adaptive finite impulse response (FIR) filter for estimating a transfer function of an echo channel in a communications link. Optimized versions of the Least Mean Square (LMS) and Normalized LMS (NLMS) algorithms are used to adapt the filter coefficients of the estimated transfer functions.

In a first embodiment, the echo channel energy gain is included in the LMS or NLMS update equation to increase the speed at which the coefficients of the transfer function are updated. This enables adaptation speed to be proportional to the channel energy gain. The teachings of the present invention provide an algorithm for estimating the echo channel energy gain and for adapting the estimate based on measured system parameters, such as a measured instantaneous channel gain and a near-end voice level.

In a second embodiment, the average energy of either the microphone signal (in an acoustic echo canceler implementation, for example) or the error signal, as well as the standard reference signal, are included in the NLMS update equation. As a result, when noise into a microphone is high and the standard reference signal is small, the overall update gain is lower than that of the standard NLMS. This embodiment permits the use of a higher nominal fixed update gain; consequently, the algorithm converges more quickly.

In a third embodiment, both (i) the echo channel energy gain and (ii) the average energy of either the microphone signal or the error signal, as well as the standard reference signal, are included in the update equation. This third embodiment, therefore, enables both a proportional adaption speed and a higher nominal update gain.

BRIEF DESCRIPTION OF THE DRAWINGS

A more complete understanding of the method and apparatus of the present invention may be had by reference to the following detailed description, when taken in conjunction with the accompanying drawings wherein:

FIG. 5A illustrates a first portion of a flowchart according to a first embodiment of the invention;

FIG. 6A illustrates a flowchart according to a first version of a second embodiment of the invention;

FIG. 6B illustrates a flowchart according to a second version of the second embodiment of the invention.

DETAILED DESCRIPTION OF THE DRAWINGS

In the following description, for purposes of explanation and not limitation, specific details are set forth, such as particular circuits, circuit components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

A preferred embodiment of the present invention and its advantages are best understood by referring to FIGS. 1–7 of the drawings, like numerals being used for like and corresponding parts of the various drawings.

Figure 1:
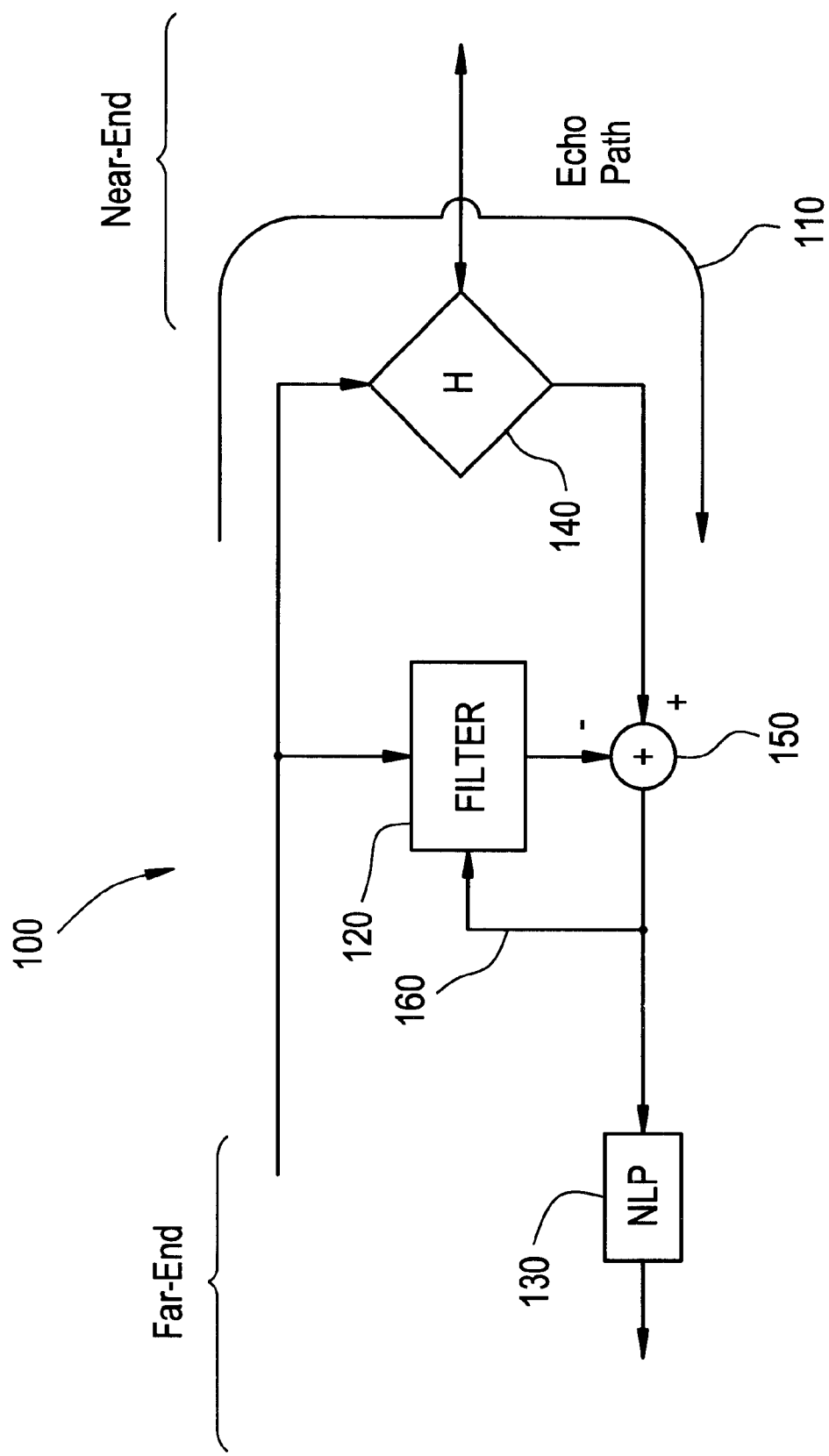
FIG. 1 illustrates a simplified schematic block diagram of a conventional echo canceler.
Figure 2A:
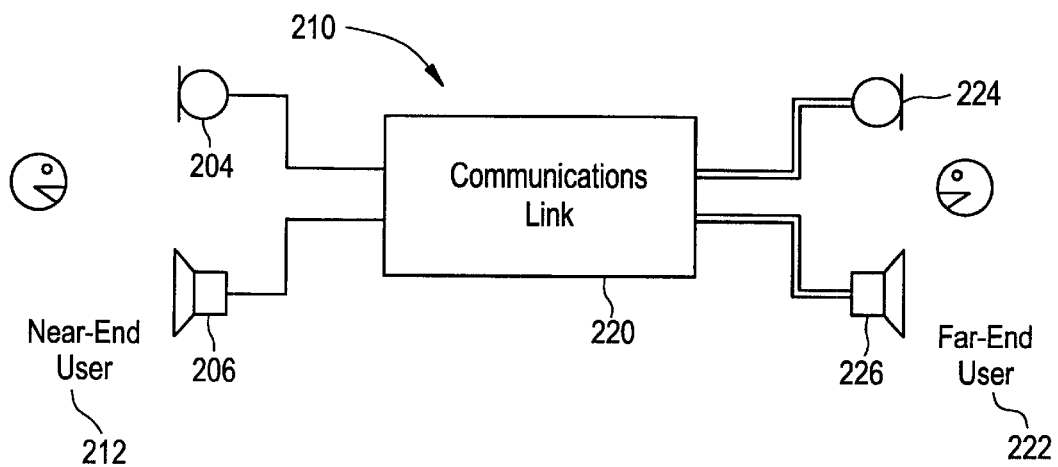
FIG. 2A illustrates a general communications process between a near-end and a far-end user.
Figure 2B:
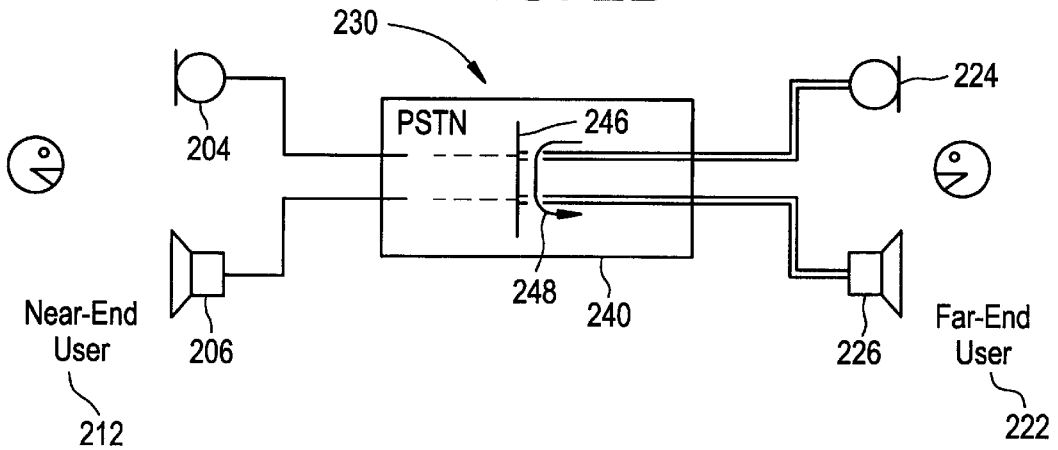
FIG. 2B illustrates a general communications process between a near-end and a far-end user with echo arising from network impedance mismatch.
Figure 2C:
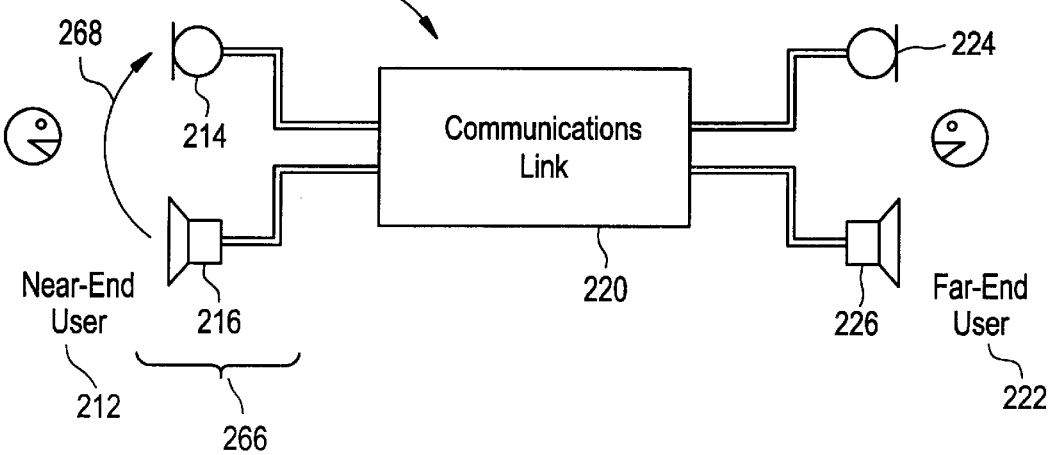
FIG. 2C illustrates a general communications process between a near-end and a far-end user with echo arising from acoustical cross-talk in a handsfree telephone.

Typical telecommunications processes are diagrammed at FIGS. 2A–2C. Referring first to FIG. 2A, a general telecommunications process 210 is diagramed. A near-end user 212 is speaking into a microphone 204 and listening from a loudspeaker 206. A far-end user 222 is speaking into a microphone 224 and listening from a loudspeaker 226. Their voices and other sounds are transmitted over a communications link 220. Their telephones can be, for example, standard landline phones with the loudspeaker placed over the ear and the microphone located near the mouth or speakerphones where the microphone and loudspeaker are both distant from the user's mouth and ear. The telephone of the far-end user 222, however, is preferably a wireless telephone in FIGS. 2A–2C, and it has therefore been shown as having a 4-wire link. On the other hand, and by way of example only, the microphone 204 and the loudspeaker 206 are shown as being part of a landline phone. Furthermore, the communications link 220 can be, for example, over telephone lines or through the air, e.g., cellular radio frequency wireless transmissions. Unfortunately, echo can spoil an otherwise good connection when a user hears his or her own voice being reflected back.

"Echo" in a telephony system is defined as a phenomenon that occurs whenever a portion of transmitted speech signal energy is reflected back to a sender. These reflections can be caused, for example, by (a) impedance mismatches in analog portions of the telephony network or (b) acoustic echo from a loudspeaker to a microphone. There can be many other different sources of these echos.

Referring now to FIG. 2B, a telecommunications process 230 over the Public Switched Telephone Network (PSTN) 240 is pictured. In the telephone network, for example, hybrid circuit 246 that converts 4-wire lines to 2-wire lines in the PSTN suffers from impedance mismatch. This impedance mismatch causes part of the voice signal 248 to reflect back to the far-end user 222 as echo. Speech from the far-end user 222 enters the communications process 230 at the microphone 224, is reflected back at hybrid circuit 246 as reflected voice signal 248, and is then transformed back into sound waves at the loudspeaker 226. This echo effect drastically reduces the sound quality of a phone call.

Referring now to FIG. 2C, a telecommunications process 250 over the general communications link 220 is pictured. In communications process 250, the near-end user 212 is using a speaker-phone, for example, a handsfree telephone 266 in a car. In the handsfree telephone 266, output from the loudspeaker 216 can be received by a microphone 214; this is termed acoustical cross-talk. Though the acoustical cross-talk is shown as occurring from the loudspeaker 216 to the microphone 214 of a wireless handsfree telephone 266, this is by way of example only. Acoustical cross-talk can also occur, for example, from the loudspeaker 206 to the microphone 204 (of FIGS. 2A and 2B), which are parts of a landline phone.

Initially, the far-end user 222 speaks into the microphone 224; the speech is then transmitted over the communications link 220 to a loudspeaker 216. The output of the loudspeaker 216 can then be characterized as reflected voice output 268, which is then amplified by the microphone 214 and transmitted back to the far-end user 222 via the communications link 220 and the loudspeaker 226, thus creating an echo. It should be noted that the degraded quality of speech signals caused by echo is intensified by the presence of a substantial delay (e.g., physical distance or processing delay) between a user's first utterance and a listener's receipt of the speech.

Fortunately, echo cancelers can be used in telephony systems to reduce or eliminate the annoying echo effect. For example, in cellular Public Land Mobile Networks (PLMNs), echo cancelers are used in mobile services switching centers (MSCs) to suppress or remove echoes in speech traffic. Echo cancelers are also used in mobile radiotelephones and handsfree telephone equipment to compensate for acoustical echoes. Finally, echo cancelers are employed within the PSTN to reduce or eliminate echos arising from impedance mismatches.

Traditionally, echo suppression has been accomplished using echo canceling circuits which employ adaptive filters to estimate and remove echo signals from a microphone output so that only near-end speech and noise are transmitted over the communications link. At least one such set of echo canceling circuits is described, for example, in U.S. patent application Ser. No. 08/852,729 entitled "An Improved Echo Canceler for Use in Communications Systems" and filed May 7, 1997, in the name of the same inventor as this application and assigned to the same Assignee (Ericsson Reference No. P08083-RMOT). application Ser. No. 08/852,729 is hereby incorporated by reference in its entirety herein. While the circuits described in the cited document are effective in canceling or suppressing echo signals, the present invention includes optimizations for a general adaptive filter algorithm that are neither described nor taught in the cited document.

Generally, the present invention teaches exemplary optimizing methods and apparatus for canceling echoes in a communication link. For example, the teachings of the present invention may be applied in the context where the driver of an automobile uses a handsfree mobile telephone to speak to either another mobile user or to a landline user. Advantageously, the teachings of the present invention are applicable to both acoustic-type echo cancelers (i.e., those designed to suppress echoes resulting from feedback between a microphone and a closely situated loudspeaker, as explained with reference to FIG. 2C hereinabove) and network-type echo cancelers (i.e., those designed to suppress echoes caused by the actual link between users, as explained with reference to FIG. 2B hereinabove). Those skilled in the art will recognize that certain of the teachings included herein are more directly applicable to a particular type of echo canceler, while other of the teachings are equally applicable to any type of canceler. Those skilled in the art will also appreciate that, although the embodiments are described in the context of mobile telephone systems for purposes of illustration, the teachings of the present invention are readily applicable to communication links of all types.

Figure 3:
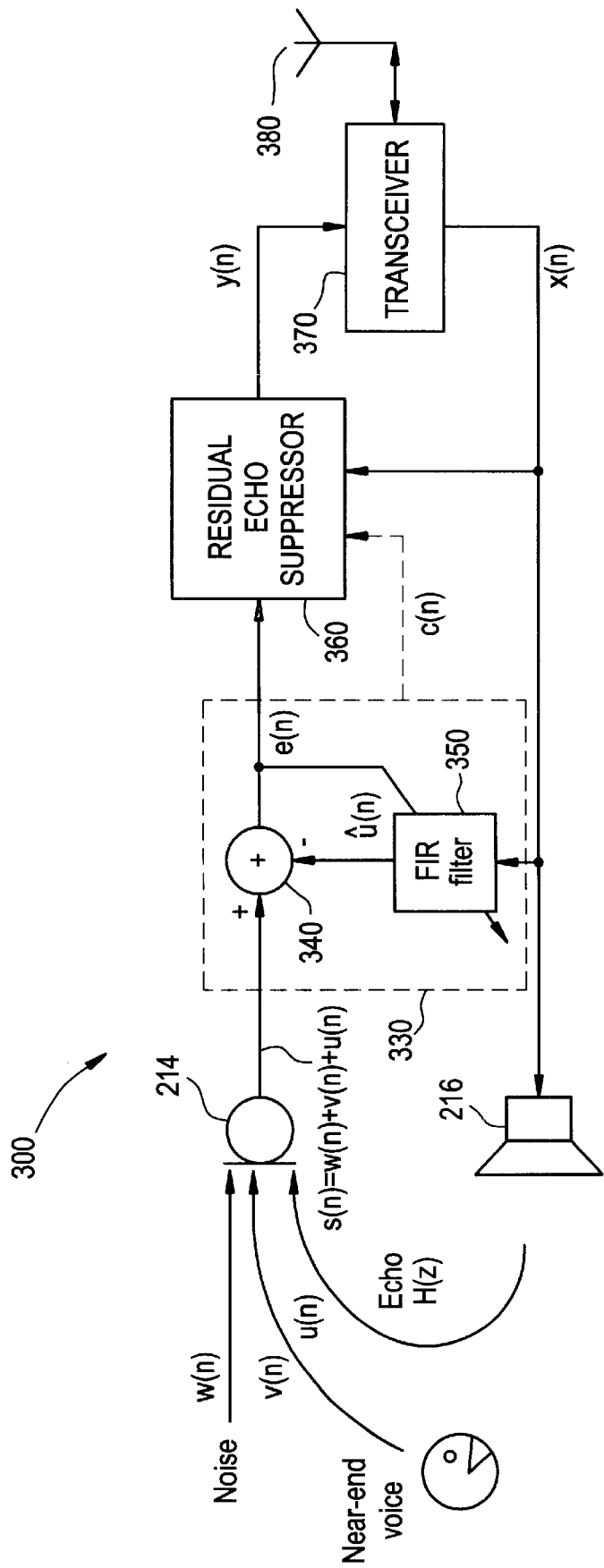
FIG. 3 illustrates a high-level block diagram of an echo suppression-system which may be used, for example, to implement the teachings of the present invention.

FIG. 3 is a high level block diagram of an echo suppression system 300 which may be used to implement the teachings of the present invention. As shown, the echo suppression system 300 comprises a microphone 214, a loudspeaker 216, an echo canceler 330, a residual echo suppressor 360, a transceiver 370, and an antenna 380. The echo canceler 330 includes a summing device 340 and an adaptive filter 350. An output of the microphone 214 is coupled to an additive input of the summing device 340. An output of the summing device 340 is connected to the adaptive filter 350 and serves as a first output of the echo canceler 330. First and second outputs of the echo canceler 330 are coupled to first and second inputs of the residual echo suppressor 360, respectively. An output of the residual echo suppressor is coupled to an input of the transceiver 370, and the transceiver 370 is bi-directionally coupled to the antenna 380. An output of the transceiver 370 is coupled to a third input of the residual echo suppressor 360, to an input of the echo canceler 330, and to an input of the loudspeaker 216. An output of the adaptive filter 350 is coupled to a subtractive input of the summing device 340.

In operation, a near-end signal s(n) arising at the output of the microphone 214 is processed using the echo canceler 330 and the residual echo suppressor 360 to produce an echo-canceled near-end signal y(n) which is transmitted to a far-end user via the transceiver 370 and the antenna 380. A far-end signal x(n) received at the transceiver 370 via the antenna 380 is input to the loudspeaker 216 for presentation to a near-end user of the system. Though the configuration of FIG. 3 is adapted for use in a mobile telephone (i.e., signals are transmitted and received to and from the far-end user through the transceiver 370 and the antenna 380), it will be appreciated that the echo canceling aspects of the embodiment of FIG. 3 are equally applicable to any bi-directional communications link. Additionally, as noted above, though the embodiment shows only an acoustic-type echo canceler, the echo canceling aspects of the embodiment are also applicable to network-type echo cancelers.

Furthermore, it will be appreciated that the system of FIG. 3 may be either analog or digital in nature, depending upon the specific application for which the system is used. Thus, the various signals of FIG. 3 (e.g., s(n), y(n), and x(n)) may actually be either continuous functions of time (i.e., s(t), y(t), and x(t)) or sequences of discrete time samples (i.e., s(nT), y(nT), and x(nT), where T represents the sample period). For clarity, however, all signals are assumed to be digital in the present discussion, and signals are therefore written succinctly as functions of sample number only (i.e., s(n), y(n), and x(n)). Though they are not explicitly shown, analog-to-digital and digital-to-analog converters are presumed to be located within the described circuitry as appropriate (e.g., at the output of the microphone 214 and at the input of the loudspeaker 216 in FIG. 3). It will be appreciated by those skilled in the art that the assumption of digital signals results in no loss of generality, as analog equivalents to the digital embodiments described herein can be readily derived.

As indicated in FIG. 3, the near-end signal s(n) may comprise several components, including a near-end noise component w(n), a near-end voice component v(n), and a near-end echo component u(n). The noise component w(n) may arise, for example, due to road and traffic sounds where the echo suppression system 300 is implemented in an automobile mobile telephone. The echo component u(n) arises as acoustic output from the loudspeaker 216 is reflected back to the microphone 214. As is well known, the amplitude and shape of the echo component u(n) will depend upon an effective system transfer function, or acoustic echo path, H(z) that exists between the loudspeaker 216 and the microphone 214. The system transfer function H(z) will depend upon, among other things, the near-end environment and the relative physical placement of the loudspeaker 216 and the microphone 214. Therefore, the transfer function H(z) will be generally unknown and will vary with changes in the near-end environment (e.g., as a near-end user changes the position of his or her car seat).

Generally, the echo canceler 330 processes the far-end signal x(n) using the adaptive filter 350 to produce an estimate û(n) of the echo component u(n) of the near-end signal s(n). The transfer function of the adaptive filter 350 is set to approximate the system transfer function H(z), and the estimate û(n) is subtracted from the near-end signal s(n) using the summing device 340 to produce an echo canceler output signal e(n). Assuming that only the far-end user is speaking and that the near-end is noise-free (i.e., v(n) and w(n) are zero), then the output signal e(n) will represent the difference between the near-end echo signal u(n) and the echo signal estimate û(n). Thus, the echo canceler output signal e(n) is often referred to as an "error" signal. Because the system transfer function H(z) varies with time, the error signal e(n) is used to update the transfer function of the adaptive filter 350, as is described below, so that it tracks the true system transfer function H(z).

When the system 300 is first installed or powered up, or when the system transfer function H(z) changes abruptly, there will exist a finite period of time during which the transfer function of the adaptive filter 350 is a relatively poor approximation of the true transfer function H(z). However, as the filter 350 adapts in response to the error signal e(n), the transfer function of the adaptive filter 350 will converge toward the true transfer function H(z). Thus, the echo canceler 330 is said to be converged, or unconverged, depending upon whether the transfer function of the adaptive filter 350 is, or is not, a good approximation of the true system transfer function H(z), respectively.

When the echo canceler 330 is converged, the error signal e(n) represents an echo-canceled version of the near-end signal s(n) as desired. However, when the echo canceler 330 is unconverged, the error signal e(n) will likely contain an unacceptably, large echo component. Additionally, persistent user movement as well as non-linearities in the near-end signal s(n), generated for example by the loudspeaker 216 or other non-linear system components (not shown), may prevent the echo canceler 330 from ever fully is converging to suppress echo much beyond 12–20 dB. Therefore, some form of residual echo suppression may be necessary to obtain improved levels of, for example, 45 dB.

As shown in FIG. 3, a residual echo suppressor 360 can be located at the output of the echo canceling device 330 to provide such additional echo attenuation. A conventional residual echo suppressor is described, for example, in U.S. Pat. No. 5,475,731, which is hereby incorporated by reference in its entirety herein. It should be noted, however, that other types of residual echo suppressors would be equally applicable for use with the present invention.

Generally, the residual suppressor 360 attenuates echo components in the error signal e(n) by processing the error signal e(n) using a center clipper having an adjustable clipping threshold. The level of residual echo suppression varies in proportion to the magnitude of the clipping threshold, as does the level of distortion introduced on any near-end voice or noise component which may be present in the error signal e(n). The clipping threshold of the residual echo suppressor 360 is adjusted, in exemplary embodiments, in accordance with a control signal c(n) which is based on a measure of the relative level of cancelation attained by the echo canceler 330. In other words, as the echo canceler 330 converges, and the effective level of echo cancelation provided by the echo canceler 330 increases, the clipping threshold of the residual echo suppressor is reduced, and vice versa. In this way, the residual echo suppressor 360 is activated only to the extent necessary, and any distortion introduced by the residual suppressor 360 is minimized.

Because the present application is directed to exemplary optimizing embodiments of the echo canceler 330, a detailed discussion of the operation of the residual echo suppressor 360 is omitted. It is sufficient for purposes of the present application to realize that such a residual echo suppressor can be effectively utilized in conjunction with the embodiments of the present invention, provided that an appropriate measure of the prevailing level of cancelation attained by the echo canceler 330 can be computed. It should, however, be appreciated that use of the residual echo suppressor 360 is optional, and that the exemplary optimizing embodiments of the echo canceler 330 described below are is extremely useful standing alone. Before exemplary optimizing embodiments are described in detail, however, a general implementation of an LMS algorithm used in echo cancelation is described in order to illuminate the features and advantages of the present invention.

Figure 4:
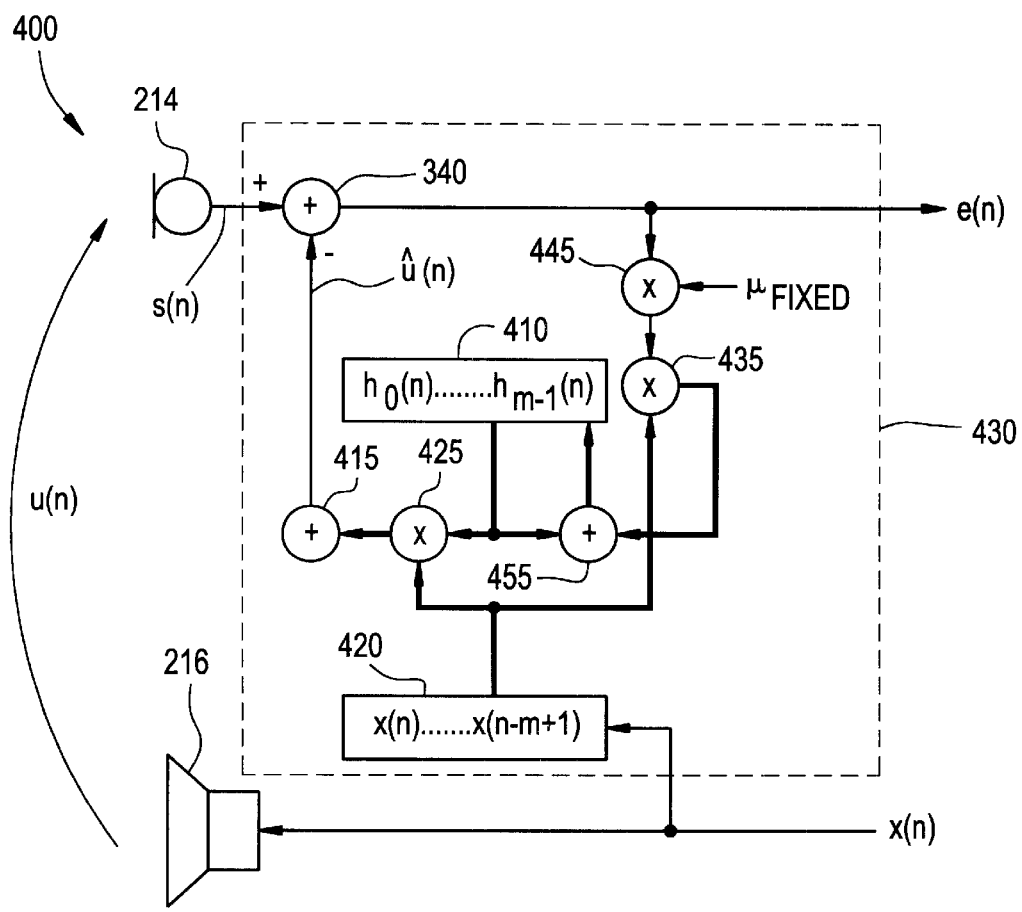
FIG. 4 illustrates a least-mean-square (LMS) echo canceling device employing an adaptive filter to cancel an echo component of an information signal.

FIG. 4 is a block diagram of a conventional echo canceling system 400 in which a least-mean-square (LMS) algorithm is used to update the coefficients of an adaptive echo-canceling filter. As shown, the conventional system 400 comprises a microphone 214, a loudspeaker 216, and an echo canceler 430. The echo canceler 430 comprises first, second, and third summing devices 340, 415, 455, first, second, and third multipliers 445, 435, 425, a coefficient register 410, and a sample queue 420. For convenience, components not necessary for an understanding of the operation of the system 400 of FIG. 4 (e.g., a transceiver, an antenna, an optional residual echo suppressor, etc.) are not shown. In FIG. 4, thin lines are used to represent serial, or scalar, connections and thick lines are used to represent parallel, or vector, connections.

As shown, an output s(n) of the microphone 214 is coupled to an additive input of the first summing device 340. An output of the first summing device 340 is coupled to a first input of the first multiplier 445 and serves as an output e(n) of the echo canceler 430. A scalar update gain factor $\mu_{FIXED}$ is coupled to a second input of the first multiplier 445, and an output of the first multiplier 445 is coupled to a first input of the second multiplier 435. A parallel output of the second multiplier 435 is coupled to a first input of the third summing device 455, and a parallel output of the third summing device 455 is input to the coefficient register 410.

Parallel output of the coefficient register 410 is coupled to a second input of the third summing device 455 and to a first input of the third multiplier 425. A parallel output of the third multiplier 425 is coupled to an input of the second summing device 415, and an output û(n) of the second summing device 415 is coupled to a subtractive input of the first summing device 340. A far-end signal x(n) is coupled to an input of the loudspeaker 216 and to the sample queue 420. Parallel output of the sample queue 420 is coupled to a second input of the second multiplier 435 and to a second input of the third multiplier 425.

In operation, the most recent m samples of the far-end signal x(n) . . . x(n−m+1) are stored in the sample queue 420, and a set of prevailing LMS filter coefficients $h_0(n)$ . . . $h_{m-1}(n)$ are stored in the coefficient register 410. An estimate û(n) of the echo component u(n) of the error signal e(n) is then computed as a convolution of the contents of the coefficient register 410 and the far-end signal as stored in the sample queue 420, as follows:

$$\hat{u}(n) = \sum_{i=0}^{m-1} h_i(n) \cdot x(n-i). \tag{1}$$

Additionally, the LMS filter coefficients $h_0(n)$ . . . $h_{m-1}(n)$ are updated using the fixed update gain $\mu_{FIXED}$, the error signal e(n), and the contents of the sample queue 420, as follows:

$$h_i(n+1) = h_i(n) + \mu_{FIXED} \cdot e(n) \cdot x(n-i), \; i=0 \ldots m-1, \tag{2}$$

where the error signal e(n) is computed using the first summing device 340 as e(n)=s(n)−û(n). Thus, the LMS filter coefficients $h_0(n)$ . . . $h_{m-1}(n)$ converge toward those of the true system transfer function H(z) as the estimator û(n) improves and the error signal e(n) diminishes. The speed with which the coefficients $h_0(n)$ . . . $h_{m-1}(n)$ converge will depend upon the magnitude of the fixed update gain $\mu_{FIXED}$. In other words, the larger the fixed update gain $\mu_{FIXED}$, the faster the filter converges, within stability limits.

However, with a fixed update gain $\mu_{FIXED}$, a system designer trades off fast convergence for robustness in double-talk and near-end noise situations, where robustness includes low distortion of the near-end user's voice and minimal perturbation of the coefficients of the echo-estimation filter. The fixed update gain $\mu_{FIXED}$ cannot be set too high without fear that the adaptive filter will too quickly track non-echo components of the error signal e(n). Advantageously, the present invention teaches that no compromise need be made if the update gain of an echo-canceling filter is made adaptive to changes in the prevailing system environment.

Referring again to FIG. 3, echo suppression system 300 will now be used to describe the echo canceling aspects of the present invention. In review, the output of the microphone 214 is shown to be labeled s(n). As explained above, the signals can either be continuous functions of time, e.g., s(t), or sequences of discrete time samples, e.g., s(nT), but the signals will be represented as s(n) for conciseness. The input to the microphone 214 is composed of noise w(n), near-end voice v(n), and an echo component u(n) from the loudspeaker 216.

The adaptive FIR filter 350 stores and modifies an estimate of the real-world transfer function labeled H(z). The filter 350 uses, for example, the LMS or the NLMS algorithm. The far-end voice signal, also termed the reference signal, is labeled x(n). The signal x(n) is input to both the filter 350 and the loudspeaker 216. The output of the filter 350 is labeled û(n), and its negative is input into summer 340. Summer 340 also takes the signal s(n) as an input while its output is labeled e(n), for error as explained hereinabove. This error signal e(n) is also an input for the filter 350. It should be reiterated that although the present invention is being explained in terms of an acoustic echo canceler, the teachings of the present invention are equally advantageous in a network echo canceler.

The LMS algorithm for adapting the coefficients of the filter 350, using the labels in echo suppression system 300, is as follows in equations 3, 4, and 5.

$$\hat{u}(n) = \sum_{i=0}^{m-1} h_i(n) \cdot x(n-i) \tag{3}$$

$$e(n) = s(n) - \hat{u}(n) \tag{4}$$

$$h_i(n+1) = h_i(n) + \mu_{FIXED} \cdot e(n) \cdot x(n-i), \ i=0 \ldots m-1 \tag{5}$$

This is the general form of the LMS algorithm for an echo canceler. The constant $\mu_{FIXED}$ is a fixed update gain constant, and it was described in greater detail in connection with FIG. 4 hereinabove. Hence, setting $\mu_{FIXED}$ presents a designer with the same problems as discussed hereinabove in connection with FIG. 4. It must be set before the filter 350 is installed by predicting or measuring expected environmental factors and then attempting to maximize the adaption process when setting the value of $\mu_{FIXED}$.

The NLMS algorithm for adapting the coefficients of the filter 350, using the labels in echo suppression/canceler system 300, is as follows in equation 6.

$$h_i(n+1) = h_i(n) + \frac{\mu_{FIXED} \cdot e(n) \cdot x(n-i)}{K + R_{xx}(n)}, \ i = 0 \ldots m-1 \tag{6}$$

The NLMS algorithm is a modification of the LMS algorithm.

The LMS algorithm increases the adaptation rate when the reference signal (labeled x(n) in FIG. 3) is less than full scale. The NLMS algorithm divides the filter coefficient update by the reference signal energy ($R_{xx}(n)$) plus a constant K to make the adaptation speed independent of the reference signal level, at least up to the point that the reference energy is small compared to the constant. $R_{xx}(n)$ represents the short-term average energy of the loudspeaker's 216 signal energy x(n) in FIG. 3. The NLMS algorithm is also well known in the signal processing field and is described in many textbooks.

In a first embodiment, the LMS and NLMS algorithms are optimized. As stated above, the constant $\mu_{FIXED}$ is a fixed update gain constant. The channel energy gain $g_{chan}$, on the other hand, does not stay fixed. The channel energy gain $g_{chan}$ in an acoustic echo situation (e.g., a handsfree phone installed in an automobile), for instance, varies significantly from one installation to another depending on where the microphone and loudspeaker are placed. The channel energy gain $g_{chan}$ in a network echo situation (e.g., in a PSTN connection), for instance, also varies greatly from one call to another depending on the hybrid impedance mismatch of the line to which the particular landline phone is connected.

Absent the benefits of the present invention, maximizing performance characteristics necessitates making certain tradeoffs in anticipation of a myriad of possible channel energy gains $g_{chan}$. Of course, the lowest common denominator generally must be selected. Specifically, if the fixed update gain constant $\mu_{FIXED}$ is set so that the algorithm is stable when the channel energy gain $g_{chan}$ is very low, then that setting of the fixed update gain constant $\mu_{FIXED}$ causes slow adaptation when the channel energy gain $g_{chan}$ is high. On the other hand, if the fixed updated gain constant $\mu_{FIXED}$ is set so that the filter 350 adapts quickly when the channel energy gain $g_{chan}$ is high, then that setting of the fixed update gain constant $\mu_{FIXED}$ causes instability in the system when the channel energy gain $g_{chan}$ is very low.

Advantageously, the present invention includes the channel energy gain $g_{chan}$ in the LMS/NLMS update equation to make adaptation speed proportional. This optimization for the LMS and the NLMS algorithms is given in mathematical form in equation 7 and equation 8, respectively.

$$h_i(n+1) = h_i(n) + \mu_{FIXED} \cdot g_{chan} \cdot e(n) \cdot x(n-i), \ i=0 \ldots m-1 \tag{7}$$

$$h_i(n+1) = h_i(n) + \frac{\mu_{FIXED} \cdot g_{chan} \cdot x(n-i)}{K + R_{xx}(n)}, \ i = 0 \ldots m-1 \tag{8}$$

Implementing these equations as part of an LMS or NLMS algorithm requires estimating the channel energy gain $g_{chan}$. The following MATLAB code (comparable to pseudo-code) estimates the channel energy gain (designated as the variable aecChanGain in the code) and then modifies the estimate based on one or more measured system parameters.

The MATLAB code as reproduced immediately below is an excerpt from a complete simulation of an acoustic echo canceler. It is to be understood that the MATLAB code is exemplary only and should not be taken to be limiting. The invention can be implemented in, for example, hardware, software, or firmware; furthermore, the values selected, the precise steps, and even the order of the steps in the code below can be altered, substituted, omitted, or rearranged in numerous ways by one of ordinary skill after understanding the teachings of the present invention.

The exemplary MATLAB Code is as follows:

```
% Glossary:
   % EC=Echo Canceler=linear echo suppresser
   % AEC=Acoustic-Echo Canceler=loudspeaker-echo
     canceler
   % VAD Voice-Activity Detector
% Before running this script, set the following variables:
   % inFile=name of input file, left=far end, right=near
     end.
   % outfile=name of output file, left=ANLP output,
     right=AEC output.
   % All files use the raw format of the DAT-Link.
   % estnoise.m contains the function to estimate noise.
   % Maximum positive value for fractional representa-
     tion.
ONE=32767/32768;
% Read file containing far-end and near-end signals.
fidIn=fopen(inFile, 'r');
if fidIn==-1
   error(['Error opening file' infile])
end
[LRmatrix, wordCount] =fread(fidIn, [2, inf], 'int16');
fclose(fidIn);
% The number of samples in the update integration
   period.
```

```
FRAME_SIZE=160,
% Larger frame sizes give greater robustness to double-
    talk & near-end noise
% which tend to integrate towards zero.
% Larger also improves ability to detect convergence
    because the correlated
% update grows proportionally with frame size whereas
    the uncorrelated (noise)
% grows with the square-root of the frame size.
% Smaller improves reaction time to changes (echo
    path, single->double talk)
% and speeds up convergence.
% Smaller also improves ability to reject vowel sounds.
% 160 is used for ease of porting to a 160-samples-
    per-frame TDMA phone.
% The resulting 20 ms frame is nearly optimum for
    dividing speech into
% stationary-signal segments.
NFRAMES=floor((wordCount/2)/FRAME_SIZE); %
    Number of frames to process.
clear wordCount
NSAMPLES=NFRAMES*FRAME_SIZE; % Length
    of sample-based vectors for
debug.
%
% Load the mic (uplink) and speaker (downlink) VAD
    outputs from separate
% files. If each file is not found, run the C executable
    on the near-end and
% far-end sound files, and save the VAD outputs in a
    file with the same
% prefix.
%
fidIn=fopen([inFile'_up_vad'], 'r');
if fidIn=-1
    disp(['File='inFile'_up_vad not found—creating..
        . '])
    fidOut=fopen('vad_in.raw', 'w');
    fwrite(fidOut, LRmatrix(2,:), 'int16'); % Uplink
        audio
    fclose(fidOut);
    !nrsim-s=f vad_in.raw junk vad_out.bit
    !rm vad_in.raw
    !rm junk.flt
    fidIn=fopen('vad_out.bit', 'r');
    if fidIn=-1
        error('Error opening file=vad_out.bit')
    end
    micVad=fread(fidIn, NFRAMES, 'int8');
    !rm vad_out.bit
    fclose(fidIn);
    fidOut=fopen([inFile'_up_vad'], 'w');
    fwrite(fidOut, micVad, 'int8');
    fclose(fidOut);
else
    micVad=fread(fidIn, NFRAMES, 'int8');
    fclose(fidIn);
end
fidIn=fopen([inFile'_down_vad'], 'r');
if fidIn=-1
    disp(['File='inFile'_down_vad not found-—
        reating . . . '])
    fidOut=fopen('vad_in.raw', 'w');
    fwrite(fidOut, LRmatrix(1,:), 'int16'); % Downlink
        audio
    fclose(fidOut);
    !nrsim-s=f vad_in.raw junk vad_out.bit
    !rm vad_in.raw
    !rm junk.flt
    fidIn=fopen('vad_out.bit', 'r');
    if fidIn=-1
        error('Error opening file=vad_out.bit')
    end
    speakerVad=fread(fidIn, NFRAMES, 'int8');
    !rm vad_out.bit
    fclose(fidIn);
    fidOut=fopen([inFile'_down_vad'], 'w');
    fwrite(fidOut, speakerVad, 'int8');
    fclose(fidOut);
else
    speakerVad=fread(fidIn, NFRAMES, 'int8');
    fclose(fidIn);
end
% Scale inputs to use range of −1 to ONE.
LRmatrix=LRmatrix/32768;
% Number of bits to right shift values accumulated
    over a frame of samples.
FRAME_BITS=ceil(log2(FRAME_SIZE));
% Scale factor to quantize energies to 32 bits (Z8.23
    format w/FRAME_SIZE=160)
ENERGY_SCALE=2^(31-FRAME_BITS);
% Number of taps in the reference delay line.
% It must be long enough that the high-delay taps are
    mostly uncorrelated with
% the far-end signal and only have near-end energy.
AEC_REF_TAPS=512;
% Number of taps in the FIR echo-estimation filter.
AEC_COEF_TAPS=256;
% Number of taps in the high-delay section of the
    update vector for measuring
% near-end energy.
AEC_NEAR_TAPS=128;
% Length of vector for capturing car noise samples.
COMFORT_NOISE_SIZE=128;
% Calculate the threshold on the update vector peak-
    to-baseline ratio for
% determining the maximum update gain. For noise
    uniform in the range of
% [−1 1], the expected peak update magnitude is
    g*FRAME_SIZE/3, while the
% expected RMS of the update vector for the uncor-
    related taps is
% g*sqrt(FRAME_SIZE)/3, where g is the echo path
    gain. Therefore, the maximum
% update vector peak-to-baseline ratio is sqrt
    (FRAME_SIZE).
% However, voice does not have a constant envelope
    like noise. Because
% FRAME_SIZE is much smaller than the update
    vector length, a burst of speech
% will sometimes be in the area of the update vector
    where the peak is
% measured but not in the area where baseline is
    measured. Therefore, real
% peak-to-baseline ratios can be extremely high
    (>300).
% Setting the threshold too low will cause instability
    due to high-gain
% updates even for low-energy far-end signals under
    noisy or double-talk
% conditions.
% Setting the threshold too high will cause slow
    adaptation due to high-gain
% updates only for high-energy far-end signals after
    large echo-path changes.
```

% This threshold was empirically determined as a compromise.
AEC_MAX_GAIN_THRESH=16;
% The peak-to-RMS for noise is independent of the frame size. This threshold
% for rejecting near-end voice/noise and far-end periodic signals (tones and
% vowels) was empirically derived.
AEC_BASELINE_THRESH=5.5;
% Pre-calculate the constant to use as a multiplier for the status gauge.
AEC_STATUS_GAUGE_SCALER=floor(32768/ . .
 . (AEC_MAX_GAIN_THRESH_AEC_BASELINE_THRESH))/32768;
% Create the gain profile for the FIR coefs. The profile roughly matches the
% expected range of the coefs in the car. This way, updates containing
% periodic components (vowels) are forced to follow the proper exponential
% decay characteristic and minimize divergence. Lower gain on the higher
% delay taps also reduces update noise contribution to the coefs. The overall
% effect of the profile is to allow higher update gain without instability.
% Since all coefs have 16-bits of dynamic range, the higher-delay taps also
% have better quantization as a result of the profile. The profile is
% implemented by calculating the FIR 64 taps at a time with a right shift in
% between.
profile=ones(AEC_COEF_TAPS, 1);
for k=2:(AEC_COEF_TAPS/64),
  profile((k*64−63):(k*64))=ones(64, 1)*2^(1−k);
end
  % Accumulate AEC near-end-input energy over a frame.
  aecInEnergy=sum(uplinkAudio.^2);
  % Quantize energy to 32 bits.
  aecInEnergy=floor(aecInEnergy*ENERGY_SCALE)/ENERGY_SCALE;
% Initialize variables
aecRef=zeros(1, AEC_REF_TAPS); % To use the last values:
aecCoef=zeros(AEC_COEF_TAPS, 1); % Comment out this
aecInNoise FRAME_SIZE; % Comment out this
aecInEchoNoise=aecInNoise; % Comment out this
anlpInNoise=aecInNoise; % Comment out this
aecChanGain=ONE; % Comment out this
aecVoiceGain=ONE; % Comment out this
aecVoiceGainBase=aecVoiceGain; % Comment out this
aecNearGain=aecVoiceGain; % Comment out this
aecEchoGain=aecVoiceGain; % Comment out this
anlpComfortNoiseInOld=0; % Comment out this
anlpComfortNoiseOutOld=0; % Comment out this
anlpComfortNoise=zeros(1, COMFORT_NOISE_SIZE); % Comment out this
anlpArCoef=0.75; % Comment out this
aecNearRatio=0; % Init for history only
aecInNoiseStateVars=[aecInNoise 0 0];
aecInEchoNoiseStateVars=[aecInEchoNoise 0 0];
anlpInNoiseStateVars=[anipInNoise 0 0];
anlpSeed=1;
anlpArGain=1−anlpArCoef;
anlpRefEnvelope=0;
anlpOutLast=0;
anlpNearSpeechCount=0;
anlpNearSpeechFlag=0,
fidOut=fopen(outFile, 'w');
for frame=1: NFRAMES,
  frame % Display the frame number to indicate progress.
  %
  % AEC pre-frame section
  %
  % Since there is a gap between taps of the reference vector which are used
  % to update the FIR coefficients and those used in correlation of near-end
  % energy, the update vector need not be calculated for every tap of the
  % reference vector. Therefore, the update vector is represented by sub
  % vectors specifically for the two purposes.
  % Clear update sub-vectors which accumulate over a frame.
  aecUpdate=zeros(AEC COEF TAPS, 1); % Used for FIR coef update
  aecUpdateNear zeros(AEC_NEAR_TAPS, 1); % Used for near-end measurement
  % Clear other frame accumulators
  aecEchoEstEnergy=0;
    % Reset block-floating-point variables.
    aecShiftPending=0;
    aecErrorShift=0;
    % Get uplink and downlink PCM audio samples into buffers.
    downlinkAudio=LRmatrix(1, (frame−1)*FRAME_SIZE+1: frame*FRAME_SIZE);
    uplinkAudio=LRmatrix(2, (frame−1)*FRAME_SIZE+1: frame*FRAME_SIZE);
    % Accumulate AEC near-end-input energy over a frame.
    aecInEnergy=sum(uplinkAudio.^2);
    % Quantize energy to 32 bits.
    aecInEnergy=floor(aecInEnergy*ENERGY_SCALE)/ENERGY_SCALE;
  %
  % AEC sample section
  %
  for k=1:FRAME_SIZE,
    % Shift the far-end (loudspeaker) sample into the reference delay line and
    % calculate FIR output.
    % In the DSP, both operations are in one instruction.
    aecRef=[downlinkAudio(k) aecRef(1: AEC_REF_TAPS−1)];
  % TEST CODE START
  % The following code quickly approximates the commented-out, bit-accurate code.
    aecEchoEst=aecRef(1: AEC_COEF_TAPS)*(aecCoef.*profile);
    aecEchoEst=max(min(round(aecEchoEst*32768)/32768, ONE), −1);
  % TEST CODE END
  % aecEchoEst=0;
  % for m=(AEC_COEF_TAPS/64): −1:2,
  %  aecEchoEst=aecEchoEst+aecRef(m*64−63: m*64)*aecCoef)m*64−63: m*64);
  % aecEchoEst=max(min(aecEchoEst,ONE), −1)/2;

```
% % Quantize for S.31 format
% aecEchoEst=floor(aecEchoEst*2^31)/2^31;
% end
% aecEchoEst=aecEchoEst+aecRef(1:64)*aecCoef
    (1:64);
% aecEchoEst=max(min(aecEchoEst,ONE), -1);
% % Quantize for S.15 format
% % Add 2^(-17) to force the 1's complement floating
    point to act the same
% % as 2's complement when rounding a negative
    number with a fraction of
% % exactly 0.5.
% aecEchoEst=round(aecEchoEst*32768+2^(-17))/
    32768;
% aecEchoEst=max(min(aecEchoEst, ONE), -1);
    % Accumulate echo-estimate energy over a frame.
    % To improve small-signal performance and to make
        this measurement in the
    % same way as the other energy accumulations, the
        full 40-bit accumulator
    % is saved between loop passes.
    aecEchoEstEnergy=aecEchoEstEnergy+
        aecEchoEst^2;
    % Calculate the AEC output=near-end (microphone)
        input—echo estimate.
    uplinkAudio(k)=max(min(uplinkAudio(k)—
        aecEchoEst, ONE), -1);
    % Accumulate coef update=correlation of error
        (uplinkAudio(k)) and
    % reference. Use block floating point representation,
        where aecErrorShift
    % is the exponent and aecUpdate/aecUpdateNear( )
        is the mantissa.
    T=uplinkAudio(k)*2^aecErrorShift;
    % Quantize for S.15 format
    T=floor(T*32768)/32768;
    if aecShiftPending,
        ASM=-1;
        aecErrorShift=aecErrorShift-1;
        aecShiftPending=0;
    else
        ASM=0;
    end
    % Calculate for the region used to update the FIR
        coefficients.
    aecUpdate=aecUpdate+T*aecRef(1: AEC_COEF_
        TAPS)';
    % Calculate for the region used to measure near-end
        energy.
    aecUpdateNear=aecUpdateNear+T*aecRef(AEC_
        REF_TAPS-AEC_NEAR_TAPS+1: AEC_
        REF_TAPS)';
    % Quantize for S.15 format
    % Add 2^(-17) to force the 1's complement floating
        point to act the same
    % as 2's complement when rounding a negative
        number with a fraction of
    % exactly 0.5.
    aecUpdate=round(aecUpdate*32768+2^(-17))/
        32768;
    aecUpdateNear=round(aecUpdateNear*32768+2^(-
        17))/32768;
    aecUpdate=max(min(aecUpdate, ONE), -1);
    aecUpdateNear=max(min(aecUpdateNear, ONE),
        -1);
    aecUpdate=aecUpdate*2^ASM;
    aecUpdateNear=aecUpdateNear*2^ASM;
    % Quantize for S.15 format after possible right shift.
    aecUpdate=floor(aecUpdate*32768)/32768;
    aecUpdateNear=floor(aecUpdateNear*32768)/
        32768;
    % Find the peak square of the update vector (assume
        in first 128 taps).
    % The goal is to get the peak absolute value, but the
        peak square takes
    % fewer cycles in the DSP, even with the sqrt at the
        end of the frame.
    aecUpdatePeak2=max(aecUpdate(1:128). ^2);
    % Flag indicates if update needs divided by 2 in the
        next loop.
    aecShiftPending=aecUpdatePeak2>0.25; % 0.25=
        0.5^2
end
% Quantize energy for 32-bits.
    aecEchoEstEnergy=floor
        (aecEchoEstEnergy*ENERGY_SCALE)/
        ENERGY_SCALE;
%
% AEC post-frame section
%
aecOut=uplinkAudio; % Save for output to file for
    debug.
% Accumulate AEC-output energy over a frame.
aecOutEnergy=sum(uplinkAudio. ^2);
% Quantize energy for 32-bits.
aecOutEnergy=floor(aecOutEnergy*ENERGY_
    SCALE)/ENERGY_SCALE;
% The true reference energy is different for each
    element of the update
% vector. aecUpdate(1) would use the energy from
    aecRef(1),
% aecUpdate(2) would use the energy from aecRef(2),
    and so forth. To
% reduce complexity, use a single number to represent
    the reference energy.
% When the reference energy is used to measure the
    channel echo gain
% for determining adaptation speed or to normalize the
    update (NLMS), using
% too small of a value could cause instability. The
    compromise solution
% implemented here is to use the maximum of the
    endpoints where profile=1.
aecRefEnergy=max(sum(aecRef(1:FRAME_SIZE).
    ^2), . . . sum(aecRef(64:FRAME_SIZE+63). ^2));
% Quantize for Z8.7 format
aecRefEnergy=floor(aecRefEnergy*128)/128,
% Measure the update baseline as the RMS of the
    high-delay elements where
% the correlation between the error and far-end signals
    is expected to be 0.
% Add 1 LSB to the result to ensure aecUpdateBase is
    greater and
% aecPeakToBase is smaller after quantization. This
    avoids the false
% impression of higher echo correlation.
% Adding 1 LSB after a floor operation produces the
    same result as a ceiling
% operation except for the rare case when all the
    truncated bits equal zero.
aecUpdateBase=sum(aecUpdateNear. ^2)/AEC_
    NEAR_TAPS;
% Quantize squared intermediate result for Z.31 format
aecUpdateBase=floor(aecUpdateBase*2^31)/2^31;
```

```
aecUpdateBase=sqrt(aecUpdateBase);
% Quantize for Z.15 format
aecUpdateBase=floor(aecUpdateBase*32768+1)/
    32768;
% Find the peak magnitude of the update vector.
aecUpdatePeak=sqrt(aecUpdatePeak2);
% Calculate the update peak-to-baseline ratio.
aecPeakToBase=aecUpdatePeak/aecUpdateBase;
% Quantize for Z11.4 format since 4 fractional bits are
    sufficient.
aecPeakToBase=floor(aecPeakToBase*16)/16;
% Calculate the status gauge (range=[0, ONE]) from
    the update peak-to
% baseline ratio. The gauge, used in down-stream
    processing, stays the same
% even though the peak-to-baseline ratio changes with
    frame size and the
% baseline threshold could change.
% For near-end voice/noise or far-end periodic signals
    (vowels), gauge<0.1
% For example, the first frame of a DTMF tone, with
    frequencies of 941 Hz
% and 1209 Hz, was found to produce aecPeakToBase=
    3.5 and, thus,
% aecStatusGauge=0).
% For double talk, gauge<0.3.
% For far-end single talk:
% gauge=ONE when canceler is grossly unconverged,
    regardless of noise.
% If the near-end is quiet, gauge=ONE until near
    complete convergence.
% As the canceler converges, only residual echo higher
    in energy than the
% near-end noise level causes gauge=ONE.
% Thus, near-end noise causes fewer updates, not
    reduced update gain.
aecStatusGauge=(aecPeakToBase—AEC_
    BASELINE_TRESH)* . . . AEC_STATUS_
    GAUGE_SCALER;
aecStatusGauge=max(min(aecStatusGauge, ONE), 0);
% Quantize for Z.15 format
aecStatusGauge=floor(aecStatusGauge*32768)/32768
% Estimate the noise frame energy at the AEC input.
[confirmedNoVoiceFlag, aecInNoiseStateVars]=
    estnoise(aecInEnergy, . . . (micVad(frame)=0) &
    (aecStatusGauge=0), aecInNoiseStateVars);
aecInNoise=aecInNoiseStateVars(1);
aecInNoise % Display for status
aecInNoiseHist(frame)=aecInNoise; % Save for debug
% Estimate the echo gain at the AEC input (channel
    gain).
% Update the estimate only during far-end single talk
% (speakerVad(frame)=1) & (aecStatusGauge>0.3),
    when the ratio is
% accurate despite that the reference measurement
    includes voice and noise
% while the AEC input measurement includes only
    voice (aecInVoice>
% aecInNoise*8), and when reference energy is not
    significantly affected by
% quantization (aecRefEnergy>=10/128). The instan-
    taneous gain measurement
% is not very accurate because of time misalignment
    and spectrum variations.
% Therefore, an averaging process is used. The norm of
    the echo canceler
% filter coefficients is an excellent long-term estimate
    of the channel
% gain. However, it does not track a changing echo
    path quickly enough.
% Also, since the channel gain estimate controls the
    adaptation speed of the
% linear echo canceler, stability is improved if the
    estimate is independent
% of the linear echo canceler as much as possible.
    Thus, the following
% scheme is used:
    % If the instantaneous measurement
        (aecChanGainTrial) is less than the
    % estimate (aecChanGain), pump the estimate down
        exponentially.
    % To speed adaptation, the estimate is set directly to
        the instantaneous
    % measurement if the error is greater than 50%, and
        the estimate is pumped
    % down proportionally if the error is greater than
        12.5%, i.e.,
    % (aecChanGain-aecChanGainTrial)/
        4>aecChanGain/32 for
    % aecChanGain-aecChanGainTrial>aecChanGain/
        8=aecChanGain*0.125.
    % If the instantaneous measurement is greater than
        the estimate, pump the
    % estimate up exponentially only if the measurement
        is not clearly dominated
    % by near-end voice (aecChanGainTrial<2). It
        would not work to use a
    % relative comparison such as
        (aecChanGainTrial<2*aecChanGain) because
    % no update would occur when the true channel gain
        jumps quickly.
    % Using a pump-up time constant that is ⅛ of the
        pump-down time constant
    % helps tolerate near-end voice in the instantaneous
        measurement.
    % It is difficult to tell the difference between near-
        end speech and when
    % channel echo gain gets worse. The pump-up time
        constant here
    % determines the tracking rate, and it was empiri-
        cally determined.
aecInVoice=max(0, aecInEnergy-aecInNoise);
aecInVoiceHist(frame)=aecInVoice;
if(speakerVad(frame)=1) & (aecStatusGauge>0.3) & ..
    . (aecinVoice>aecInNoise*8) & (aecRefEnergy>=
    10/128),
        % Quantize aecInVoice to 4Z8.20 format for use
            as dividend to get the
        % desired scale for the quotient.
        aecChanGainTrial=floor(aecInVoice*2^20)/2^20/
            aecReEnergy,
        % Quantize and limit quotient to Z2.13 format
        aecChanGainTrial=min(4*ONE, floor
            (aecChanGainTrial *2^13)/2^13);
        % Calculate the square root of the quotient.
aecChanGainTrial=sqrt(aecChanGainTrial);
% Quantize root to Z1.14 format
aecChanGainTrial=floor(aecChanGainTrial*2^14)/
    2^14;
if (aecChanGainTrial<aecChanGain/2),
    aecChanGain=aecChanGainTrial;
elseif (aecChanGain>aecChanGainTrial),
    aecChanGain=aecChanGain- . . . max
        ((aecChanGain-aecChanGainTrial)/4,
        aecChanGain/32);
```

```
    elseif (aecChanGainTrial<2*ONE),
        aecChanGain=min(ONE, aecChanGain+max
           (aecChanGain/256, 2^(-11)));
    end
    % Quantize for Z.15 format
    aecChanGain=floor(aecChanGain*32768)/32768;
    % Save for debug
end
```
% Determine the update gain.
% Use NLMS to make the adaptation speed constant (independent of far-end
% signal amplitude) as long as the gain is less than or equal to ONE.
% Using the max function results in faster convergence than adding 1 to
% the denominator because the resulting gain is higher.
% Using the maximum of the AEC reference and near-end-input energies limits
% the normalizing gain when there is near-end noise and/or voice. The AEC
% output energy is not used instead of the AEC near-end-input energy because
% higher gain is not desired after convergence, and because stability is
% improved by not using another parameter based on the AEC output to control
% the AEC update gain. aecInEnergy should be less than aecRefEnergy with no
% near-end voice or noise in order to avoid microphone overload (since the
% microphone gain is set according to the loudest near-end speech level).
% The energy multiplier is set to 8 if we are sure there is far-end single
% talk with low near-end noise (aecInEnergy/16>= aecOutEnergy). Otherwise
% it is set to 16. Thus, adaptation is faster when the car is quiet.
% A too-small energy multiplier results in less-stability, causing
% overshoots in the adaptation and spikes in the echo canceler output.
% The overshoots also hinder differentiation between far-end single talk,
% with a changing echo path, and near-end speech.
% A too-large multiplier increases echo gain shortly after a perturbation.
% In the numerator, use the gauge to vary the gain according to the
% conditions. Also, use the channel echo gain as a multiplier to
% optimize adaptation speed to the channel. Without this multiplier,
% adaptation is either slower than necessary for high channel
% gain or unstable for low channel gain. Using the norm
% of the adaptive filter coefficients instead of the energy-based channel
% gain results in a more accurate and consistent estimate in the
% long term, but speed and stability would be compromised in the short term
% after an echo path change.

```
if (aecInEnergy/16>=aecOutEnergy),
    aecDenom max(1, 8*max(aecRefEnergy,
       aecInEnergy));
else
    aecDenom=max(1, 16*max(aecRefEnergy,
       aecInEnergy));
end
% Quantize for Z12.3 format
aecDenom=floor(8*aecDenom)/8;
aecNumer=aecChanGain*aecStatusGauge;
% Quantize for 22Z.18 format
aecNumer=floor(aecNumer*2^18)/2^18;
aecUpdateGain=min(aecNumer/aecDenom, ONE);
% Quantize for Z.15 format
aecUpdateGain=floor(aecUpdateGain*32768)/32768;
```

In the MATLAB code above, it is noted that the norm of the echo canceler filter coefficients is an excellent long-term estimate of the channel gain. However, it does not track a changing echo path quickly enough. Also, because the channel gain estimate controls the adaptation speed of the linear echo canceler, stability is improved if the estimate is independent of the linear echo canceler as much as possible. Thus, the norm of the echo canceler filter coefficients is not used in the MATLAB code above. Nevertheless, the norm (e.g., the energy level measurement of the estimated transfer function, which is mathematically defined as the square root of the sum of the squares) of the filter coefficients is a viable option for making a long-term estimate of the channel gain.

Figure 5B:
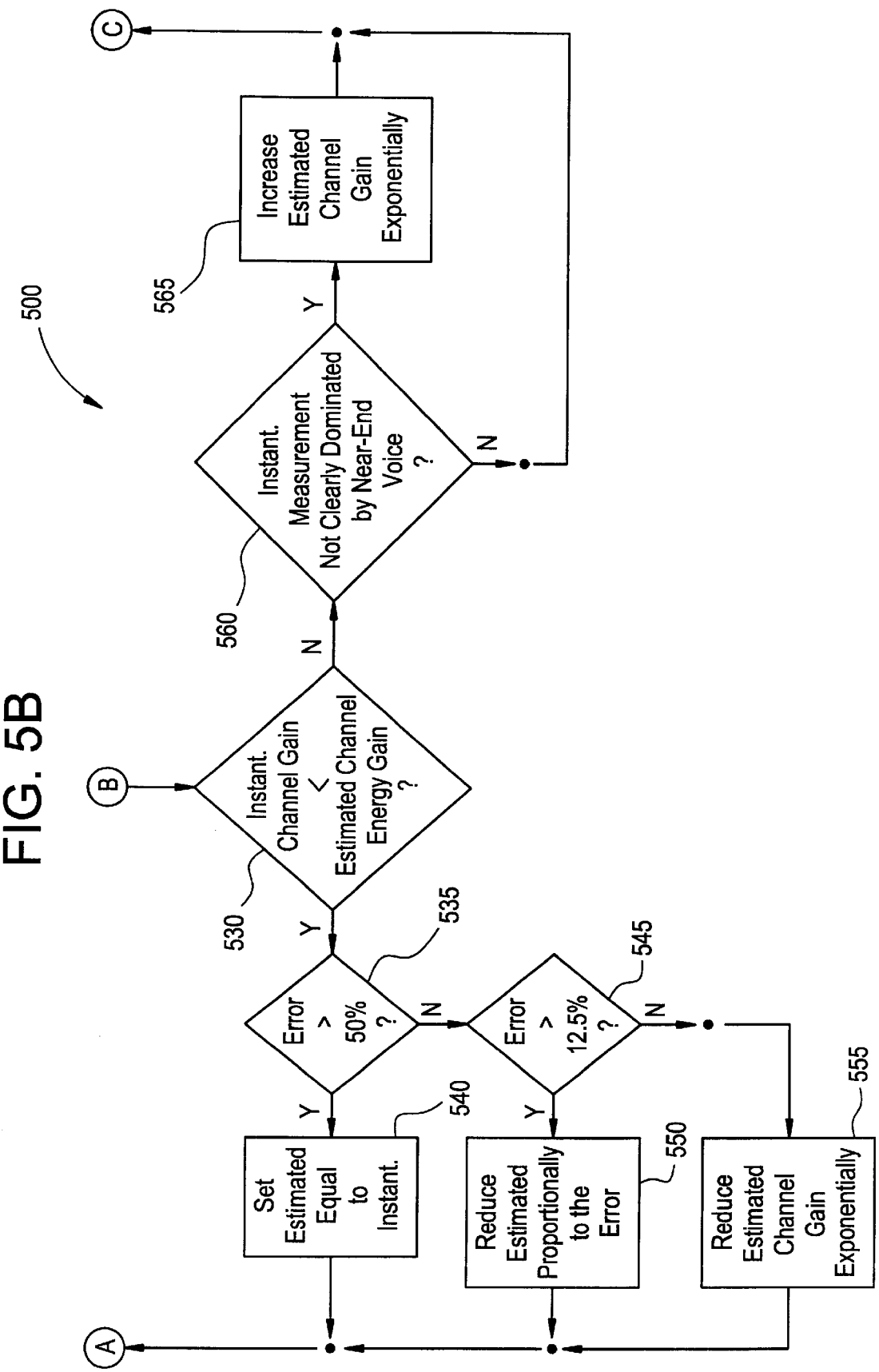
FIG. 5B illustrates the second portion of the flowchart according to the first embodiment of the invention.

Referring now to FIGS. 5A and 5B, a flowchart 500 provides a simplified description of an aspect of the process detailed in the MATLAB code. The simplified flowchart 500 in FIGS. 5A and 5B omits some details that are critical to the proper functioning of the simulation embodied by the exemplary MATLAB code. However, the flowchart 500 provides an accurate overview of the process to aid in a conceptual understanding.

FIGS. 5A and 5B illustrate the process of determining the channel energy gain $g_{chan}$ in the context of acoustical echo as diagramed in FIG. 3. Step 505 begins the process by estimating the channel energy gain. The channel energy gain is initially estimated by setting the estimated channel energy gain equal to an upper limit, which is one in a preferred embodiment of the MATLAB code. An upper limit (preferably of one) is selected because the estimated channel energy gain decreases faster than it increases in the currently preferred embodiment of the above-listed MATLAB code.

At Step 510 it is determined whether any voice activity has been detected. If not, then the process remains at Step 510 until voice activity is detected. Once voice activity is detected, a determination of whether far-end single-talk is occurring is made at Step 515. If so, then a determination of whether the ratio between voice input at the microphone 214 and the noise input at the microphone 214 is sufficient is made at Step 520. For the ratio to be sufficient in a preferred embodiment, the voice input must be greater than eight times the noise input. If the determination is negative at either of Steps 515 or 520, then the process returns to Step 510 to await voice activity detection. On the other hand, if the ratio is sufficient at Step 520, then a measurement of the instantaneous channel gain is made at Step 525. The instantaneous channel gain may be measured by first dividing the difference between the total microphone energy and the microphone noise energy by the energy of the loudspeaker. The square root of this quotient is then determined.

Subsequently, at Step 530, a determination is made whether the measured instantaneous channel energy gain is less than the estimated channel energy gain. If so, then the process continues with Step 535. In Step 535, it is determined whether the-error between the estimated channel energy gain and the measured instantaneous channel gain is greater than 50%. If so, then the estimated channel energy gain is modified by setting it equal to the measured instantaneous channel gain at Step 540. If not, then another determination is made at Step 545.

It is determined in Step 545 whether the error is greater than 12.5%. An affirmative response results in a modification of the estimated channel energy gain in Step 550 by reducing the estimated channel energy gain proportionally to the error. A negative response to Step 545 results in a modification of the estimated channel energy gain in Step 555 by reducing the estimated channel energy gain exponentially. After Step 555 (and Steps 540 and 550 as well), the process continues by returning to Step 510 to await voice activity detection.

Returning to Step 530, if the determination is made that the instantaneous channel gain is not less than the estimated channel energy gain, then the process continues with Step 560. In Step 560, it is determined whether the instantaneous measurement of channel gain is not clearly dominated by near-end voice and/or noise. For example, if the system is constrained to have a maximum limit (e.g., a maximum channel gain of one in the preferred above-listed MATLAB embodiment), then an instantaneous measurement of at least two times the limit is clearly dominated by near-end voice and/or noise. If the instantaneous measurement is not clearly dominated by near-end voice and/or noise, then the estimated channel gain is modified by increasing it exponentially in Step 565. After either Step 565 or a negative response to Step 560, the process returns to Step 510 to await the detection of voice activity.

Although specific percentages, sample durations, etc. have been used in FIGS. 5A and 5B and the MATLAB code, it is to be understood that other specific variables can be selected depending on the particular implementation, and such other implementations are within the spirit and scope of the present invention. Also, although FIGS. 5A and 5B, and FIGS. 6A and 6B hereinbelow, are directed toward an acoustic echo canceler, one of ordinary skill can extend the teachings therein to echo cancelers in general, including network echo cancelers, after understanding the teachings of the present invention.

In a second embodiment, the NLMS algorithm is optimized. The standard NLMS algorithm (see equation 6 and associated text hereinabove) produces high update gain for small reference signals ($R_{xx}(n)$) even though the resulting echo may be overwhelmed by the noise at the microphone. Consequently, the standard NLMS algorithm either is unstable or must be slowed down at all times (by reducing the fixed update gain constant $\mu_{FIXED}$) to handle these small reference signal situations.

The present invention advantageously considers other energy levels in the NLMS update equation to thereby enable the use of a higher nominal update gain constant $\mu_{FIXED}$, which helps the algorithm converge more quickly toward an estimated transfer function that accurately reflects the true transfer function H(z). This improvement for the NLMS algorithm is given in mathematical form in equations 9 and 10.

$$h_i(n+1) = h_i(n) + \frac{\mu_{FIXED} \cdot e(n) \cdot x(n-i)}{K + \max(R_{xx}(n), R_{ss}(n))}, i = 0 \ldots m-1 \quad (9)$$

$$h_i(n+1) = h_i(n) + \frac{\mu_{FIXED} \cdot e(n) \cdot x(n-i)}{K + \max(R_{xx}(n), R_{ee}(n))}, i = 0 \ldots m-1 \quad (10)$$

The purpose behind equations 9 and 10, respectively, is to take either (i) the maximum of the energies from the loudspeaker 216 ($R_{xx}(n)$) and the microphone 214 ($R_{ss}(n)$) or (ii) the maximum of the energies from the loudspeaker 216 ($R_{xx}(n)$) and the echo-canceler output ($R_{ee}(n)$) and then use this maximum value in place of the reference signal energy ($R_{xx}(n)$) in the standard algorithm.

The benefit derives from the fact that the gain boost for small reference signals is limited depending on the noise and/or near-end voice level into the microphone 214 (for equation 9). In other words, when the noise into the microphone 214 is high and the reference signal x(n) is small, the overall update gain is lower than that of the standard NLMS. When the noise into the microphone 214 is low, the overall update gain is the same as that of the standard NLMS. This technique permits the use of a higher nominal update gain $\mu_{FIXED}$; therefore, the algorithm converges more quickly. The selection of the maximum signal energy level between the reference signal x(n) and the error signal e(n) (equation 10) is an alternative embodiment that provides similar benefits in an echo canceler.

In the MATLAB code, the microphone signal s(n) (e.g., equation 9) is preferably used instead of the error signal e(n) because this technique decouples adaptation speed from the system that depends on it. The linear echo canceler is dependent on the channel gain $g_{chan}$ not the other way around. Within the MATLAB code above, the code variables correspond to the equation 9 variables as explained in Table 1 below. With respect to "uplinkAudio", the microphone signal variable in the code is reused as the error signal variable within the code. It should be noted that the MATLAB code actually calculates "$\mu_{ADAPTIVE}$" which is explained in detail hereinbelow with reference to FIG. 7. It should also be noted that the code variable "aecStatusGauge" is further described in Application Ser. No. 08/852,729, entitled "An Improved Echo Canceler for Use in Communications Systems" (Ericsson Reference No. P08083-RMOT), as also referenced above.

TABLE 1

| Equation 9 Variable | Code Variable |
| --- | --- |
| $R_{xx}(n)$ | aecRefEnergy |
| $R_{ss}(n)$ | aecInEnergy |
| $g_{chan}$ | aecChanGain |
| e(n) | uplinkAudio |

As noted hereinabove, the echo canceler optimization embodiments of the present invention are applicable to echo cancelation in general. The principles of the present invention are primarily explained above in terms of an acoustic echo canceler, but the present invention can likewise be advantageously applied, for example, in the network echo situation. To generalize, an equivalent parameter to the microphone energy of the acoustical echo situation is the network receive signal in the network echo situation. An alternative term for the microphone signal energy is "audio from the mobile station" (AFMS). A term for echo situations in general is near-end input. With respect to the loudspeaker signal energy (e.g., reference signal energy) an equivalent parameter is the network send signal in the network echo situation. An alternative term for the loudspeaker signal energy is "audio to the mobile station" (ATMS). A term for echo situations in general is far-end output.

Preferably, in the second embodiment, a short term measurement (e.g., a sum over 160 samples) of the microphone energy ($R_{ss}(n)$) and the standard reference energy ($R_{xx}(n)$) is used. A short-term measurement advantageously tracks non-stationary noise better. Furthermore, by measuring the microphone signal energy ($R_{ss}(n)$) independently of whether there is voice or not, the algorithm automatically lowers the update gain during double talk. This is also very desirable because double talk can cause instability.

Referring now to FIG. 6A, a flowchart 600 illustrates a preferred process to implement equation 9. The flowchart 600 starts at Step 605 by beginning the coefficient update process. At Step 610, the loudspeaker signal energy level ($R_{xx}(n)$) is measured. The microphone output signal energy level ($R_{ss}(n)$) is then measured at Step 615. A comparison is made, in Step 620, between signal energy level of the loudspeaker ($R_{xx}(n)$) and the signal energy of the microphone output ($R_{ss}(n)$). The greater of the two signal energy levels is then selected for use in the coefficient update process in Step 625.

In FIG. 6B, a flowchart 650 illustrates a preferred process to implement equation 10. The flowchart 650 starts at Step 655 by beginning the coefficient update process. At Step 660, the loudspeaker signal energy level ($R_{xx}(n)$) is measured. The echo-canceler output signal energy level ($R_{ee}(n)$) is then measured at Step 665. A comparison is made, in Step 670, between signal energy level of the loudspeaker. ($R_{xx}(n)$) and the signal energy of the echo-canceler output ($R_{ee}(n)$). The greater of the two signal energy levels is then selected for use in the coefficient update process in Step 675.

In a third embodiment, the improvement described hereinabove in the context of equations 7 and 8 is applied to equations 9 and 10. With respect to equation 9, both the channel energy gain $g_{chan}$ and the microphone 214 signal energy ($R_{ss}(n)$) are included in the update equation as shown in equation 11.

$$h_i(n+1) = h_i(n) + \frac{\mu_{FIXED} \cdot g_{chan} \cdot e(n) \cdot x(n-i)}{K + \max(R_{xx}(n), R_{ss}(n))}, \quad (11)$$
$$i = 0 \ldots m-1$$

Using equation 11 realizes the benefits of (i) including the channel energy gain $g_{chan}$ to make adaptation speed proportional and (ii) considering the microphone 214 energy ($R_{ss}(n)$) in the update equation to account for situations with low reference signal energy ($R_{xx}(n)$) and high microphone 214 noise.

Similarly, the third embodiment embraces including the channel energy gain $g_{chan}$ in equation 10 as shown in equation 12.

$$h_i(n+1) = h_i(n) + \frac{\mu_{FIXED} \cdot g_{chan} \cdot e(n) \cdot x(n-i)}{K + \max(R_{xx}(n), R_{ee}(n))}, \quad (12)$$
$$i = 0 \ldots m-1$$

One of ordinary skill can readily combine the flowchart 500 (of FIGS. 5A and 5B) with either the flowchart 600 or 650 (of FIG. 6A or FIG. 6B, respectively) to implement equation 11 or 12, respectively, after reading and understanding the teachings of the individual flowcharts as described hereinabove.

The signal energies in equations 7–12 may be short-term average energy signal levels. However, they may also be determined in other manners. For example, they may be determined by an autocorrelation procedure at zero delay power (e.g., τ=0; approximately the sum of the squares over a given window). Second, frame energy (e.g., the signals arriving in groups of frames; sum of the squares) may be applied. Third, filtered absolute values (e.g., filtered magnitude or $\sqrt{(x^2)}$ or $x^2$) may be implemented. Fourth, the sum of the absolute values (which has a lower complexity) may be utilized. Fifth, a peak detector output strategy may be employed. Other signal energy determination methods are equally applicable to the present invention and do not depart from the spirit and scope thereof.

Figure 7:
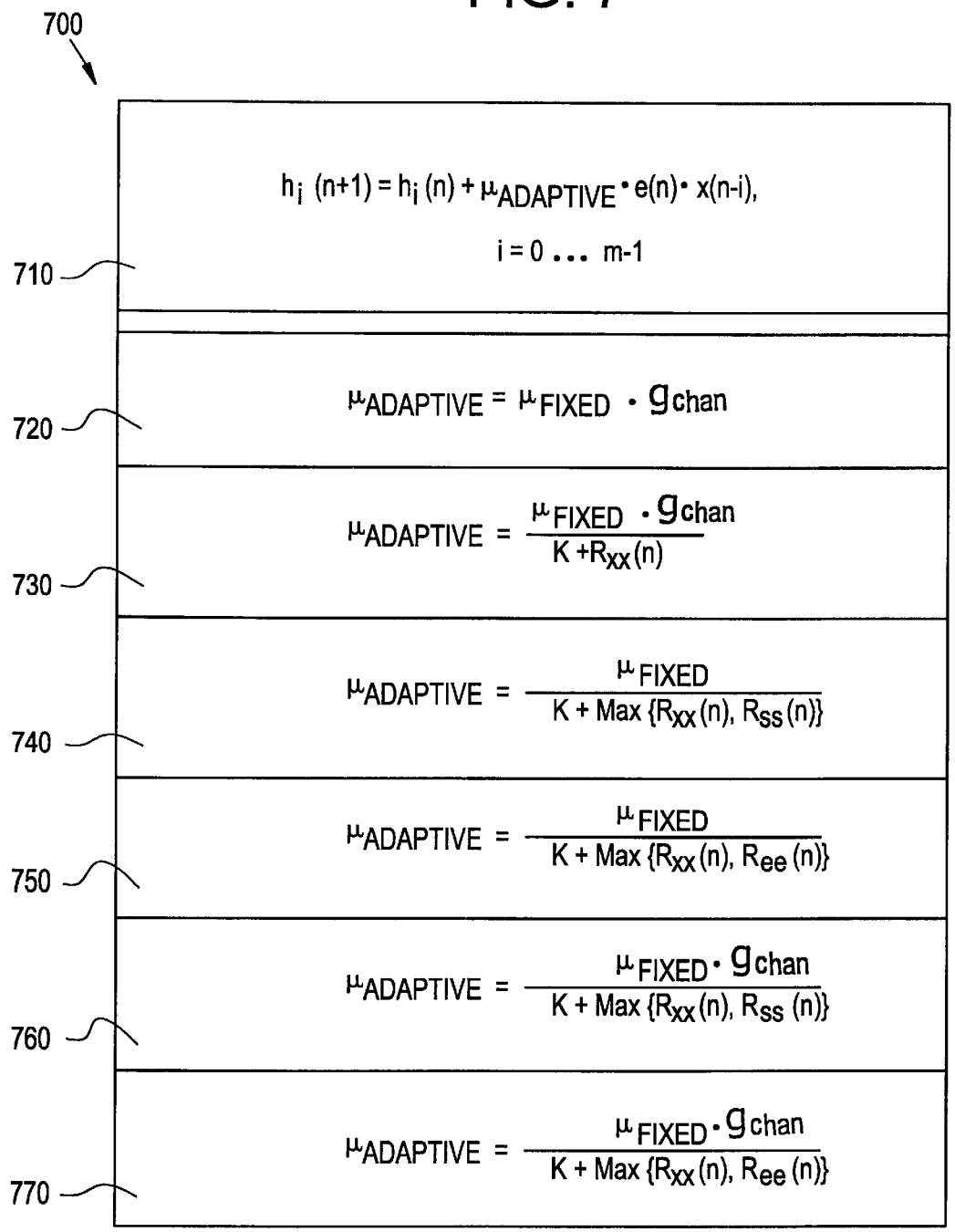
FIG. 7 illustrates adaptive optimizations for echo canceler filters in tabular form.

Referring now to FIG. 7, adaptive optimizations for echo canceler filters in tabular form are illustrated. Table 700 shows a relationship between Equations 7–12. In particular, block 710 presents a general form of equations 7–12. The variable "$\mu_{ADAPTIVE}$" represents the echo canceler filter optimization options of the present invention. As explained in detail hereinabove, the present invention adapts the updating of the echo canceler filter coefficients in response to one or more of the currently prevailing signals of the communications system.

Each of blocks 720–770 shows an optional value for "$\mu_{ADAPTIVE}$". Block 720 corresponds to equation 7 above and adaptively includes an estimate of the echo channel gain (an estimate of $g_{chan}$). Block 730 corresponds to equation 8 above and also adaptively includes an estimate of the echo channel gain (an estimate of $g_{chan}$). In block 740, which corresponds to equation 9 above, "$\mu_{ADAPTIVE}$" is such that the filter coefficients are updated in response to the maximum of either the loudspeaker signal energy ($R_{xx}(n)$) or the microphone signal energy ($R_{ss}(n)$). In block 750, which corresponds to equation 10 above, on the other hand, "$\mu_{ADAPTIVE}$" is such that the filter coefficients are updated in response to the maximum of either the loudspeaker signal energy ($R_{xx}(n)$) or the echo-canceler output signal energy ($R_{ee}(n)$).

Block 760 corresponds to equation 11 above. The "$\mu_{ADAPTIVE}$" of block 760 is responsive to both (i) the channel energy gain ($g_{chan}$) and (ii) the maximum of either the loudspeaker signal energy ($R_{xx}(n)$) or the microphone signal energy ($R_{ss}(n)$). Block 770 corresponds to equation 12 above and advantageously includes the ability to be responsive to both (i) the channel energy gain ($g_{chan}$) and (ii) the maximum of either the loudspeaker signal energy ($R_{xx}(n)$) or the echo canceler output signal energy ($R_{ee}(n)$). Any of the adaptive optimizations in blocks 720–770 of table 700 may be used in the equation of block 710 for improving the FIR filter 350 of FIG. 3.

It should be further understood that blocks 710–770 exemplify certain aspects of the present invention in the context of traditional mathematical expressions of the LMS and NLMS equations. The present invention, however, should not be construed to be so limited. Notations to particular portions of the MATLAB code above may illuminate some of the alternative embodiments of the present invention. For instance, it can be seen in the last section of the MATLAB code above (especially the last thirteen lines), that the "$\mu_{ADAPTIVE}$" of blocks 710 and 760 corresponds to the "aecUpdateGain", which equates to "(aecChanGain*aecStatusGauge) (Max [aecRefEnergy, aecInEnergy])". Thus, it can be seen that no actual numeral/variable "$\mu_{FIXED}$" need be implemented in all embodiments. In place of "$\mu_{FIXED}$", in other words, other adaptive elements may be substituted therefor. Consequently, each "$\mu_{FIXED}$" in blocks 720–770 may be substituted by a more general "$\mu$" to further demonstrate the scope of the present invention.

As another instance, in contradistinction to the classical NLMS equation which adds a constant K to an energy value in case that energy value level goes to zero, the MATLAB code takes the maximum between a constant and an energy value. This taking of the maximum is demonstrated in the last thirteen lines of the MATLAB code above when "aecDenom" is assigned a value (e.g., "aecdenom=max(1, 8*max(aecRefEnergy,aecInEnergy))". In this MATLAB code segment, 8 can be considered "$1/\mu_{FIXED}$". As still another instance of an additional embodiment that is yet more adaptive, the last thirteen lines also include the conditional statement "if(aecInEnergy/16>=aecOutEnergy)," then the "$1/\mu_{FIXED}$" is equal to eight, and if not, then "$1/\mu_{FIXED}$" is equal to sixteen. Thus, "$\mu_{FIXED}$" varies according to the prevailing system conditions and can therefore be considered unfixed, or adaptive, or simply "$\mu$".

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method in a communications system for use with an echo canceler for controlling an adaptation speed of the echo canceler, comprising the steps of:
   computing an estimated echo channel gain in response to at least one input signal to the echo canceler; and
   calculating at least one updated filter coefficient using said estimated echo channel gain, said updated filter coefficient a coefficient of an estimated transfer function of the echo channel.

2. The method of claim 1, further comprising the step of:
   modifying said estimated echo channel gain based on at least one measured system parameter.

3. The method of claim 2, wherein said step of modifying said estimated echo channel gain further comprises the steps of:
   determining a measured channel gain of the echo channel; and
   modifying said estimated echo channel gain based on said measured channel gain.

4. The method of claim 3, wherein said step of determining a measured channel gain further comprises the step of determining an instantaneous measured channel gain of the echo channel.

5. The method of claim 3, wherein said step of modifying said estimated echo channel gain further comprises the step of:
   calculating an error of said estimated echo channel gain based on a comparison between said estimated echo channel gain and said measured channel gain.

6. The method of claim 5, wherein said step of modifying said estimated echo channel gain further comprises the steps of:
   determining whether said measured channel gain is less than said estimated echo channel gain; and
   setting said estimated echo channel gain equal to said measured channel gain if (i) said error is greater than approximately 50% and (ii) said measured channel gain is determined to be less than said estimated echo channel gain.

7. The method of claim 5, wherein said step of modifying said estimated echo channel gain further comprises the steps of:
   determining whether said measured channel gain is less than said estimated echo channel gain; and
   reducing said estimated echo channel gain proportionally to the error if (i) said error is greater than approximately 12.5% and (ii) said measured channel gain is determined to be less than said estimated echo channel gain.

8. The method of claim 5, wherein said step of modifying said estimated echo channel gain further comprises the steps of:
   determining whether said measured channel gain is less than said estimated echo channel gain; and
   reducing said estimated echo channel gain exponentially if (i) said error is less than approximately 12.5% and (ii) said measured channel gain is determined to be less than said estimated echo channel gain.

9. The method of claim 5, wherein said step of modifying said estimated echo channel gain further comprises the steps of:
   determining whether said measured channel gain is less than said estimated echo channel gain;
   determining whether said measured channel gain is less than approximately twice a maximum channel gain of the echo channel; and
   increasing said estimated echo channel gain exponentially if (i) said measured channel gain is determined to be less than approximately twice said maximum channel gain and (ii) said measured channel gain is determined to be not less than said estimated echo channel gain.

10. The method of claim 2, wherein said step of modifying said estimated echo channel gain further comprises the step of:
    detecting voice activity in the communications system.

11. The method of claim 2, wherein said step of modifying said estimated echo channel gain further comprises the step of:
    detecting far-end single talk in the communications system.

12. The method of claim 2, wherein said step of computing an estimated echo channel gain further comprises the step of:
    computing an estimated acoustic echo channel gain.

13. The method of claim 2, wherein said step of computing an estimated echo channel gain further comprises the step of:
    computing an estimated network echo channel gain.

14. The method of claim 1, wherein said step of computing an estimated echo channel gain further comprises the step of:
    computing said estimated echo channel gain by calculating a norm of filter coefficients of an adaptive filter of the echo canceler.

15. The method of claim 1, wherein said step of computing an estimated echo channel gain further comprises the step of:
    computing said estimated echo channel gain by using a ratio of a far-end output signal energy level and a near-end input signal energy level.

16. A method in a communications system for use with an echo canceler for controlling an adaptation speed of the echo canceler, comprising the steps of:
    ascertaining a first parameter signal energy level for a first parameter in the communications system;
    ascertaining a far-end output signal energy level of the communications system;
    determining a maximum value that is the greater of said first parameter signal energy level and said far-end output signal energy level; and calculating at least one updated filter coefficient using said maximum value, said updated filter coefficient a coefficient of an estimated transfer function of the echo channel.

17. The method of claim 16, wherein said first parameter is a near-end input signal in the communications system.

18. The method of claim 17, wherein said near-end input signal in the communications system is a microphone input signal of a handsfree wireless phone.

19. The method of claim 16, wherein said first parameter is a an echo canceler output signal of the echo canceler in the communications system.

20. The method of claim 16, wherein said far-end output signal energy level of the communications system is a loudspeaker signal energy level in a handsfree wireless phone.

21. The method of claim 16, wherein the signal energy levels are determined by at least one of a short-term average energy signal level determination, an autocorrelation procedure, a frame energy application, a filtered absolute values implementation, a sum of absolute values utilization, and a peak detector output strategy.

22. A method in a communications system for use with an echo canceler for controlling an adaptation speed of the echo canceler, comprising the steps of:

ascertaining a first parameter signal energy level for a first parameter in the communications system;

ascertaining a far-end output signal energy level of the communications system;

determining a maximum value that is the greater of said first parameter signal energy level and said far-end output signal energy level;

computing an estimated echo channel gain in response to at least one input signal to the echo canceler;

modifying said estimated echo channel gain based on at least one measured system parameter; and calculating at least one updated filter coefficient using said estimated echo channel gain and said maximum value, said updated filter coefficient a coefficient of an estimated transfer function of the echo channel.

23. The method of claim 22, wherein:

said first parameter is at least one of a microphone input signal of a handsfree wireless phone and an echo canceler output signal of the echo canceler in the communications system; and said far-end output signal energy level of the communications system is a loudspeaker signal energy level in a handsfree wireless phone.

* * * * *